US011153719B2

(12) United States Patent
Torres et al.

(10) Patent No.: US 11,153,719 B2
(45) Date of Patent: Oct. 19, 2021

(54) SYSTEMS AND METHODS FOR IDENTIFYING AVAILABLE SERVICES AT A PHYSICAL ADDRESS

(71) Applicant: Verizon Patent and Licensing Inc., Basking Ridge, NJ (US)

(72) Inventors: Randolph Torres, Clermont, FL (US); Ashuma Singh Kaul, Princeton, NJ (US); Todd K. Jones, Clinton, AK (US); Ravi K. Sharma, Flower Mound, TX (US); Peter D. Maxwell, Plano, TX (US); Sandeep Juneja, Tampa, FL (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 17/004,138

(22) Filed: Aug. 27, 2020

(65) Prior Publication Data

US 2021/0160660 A1    May 27, 2021

Related U.S. Application Data

(63) Continuation-in-part of application No. 16/692,961, filed on Nov. 22, 2019.

(51) Int. Cl.
*H04W 4/029* (2018.01)
*G01S 19/25* (2010.01)
*H04W 64/00* (2009.01)
*H04W 4/021* (2018.01)

(52) U.S. Cl.
CPC .......... *H04W 4/029* (2018.02); *G01S 19/252* (2013.01); *H04W 4/021* (2013.01); *H04W 64/003* (2013.01)

(58) Field of Classification Search
CPC ... H04W 4/029; H04W 64/003; H04W 4/021; G01S 19/252; G06Q 10/06315
See application file for complete search history.

(56) References Cited

U.S. PATENT DOCUMENTS

| | | |
|---|---|---|
| 11,055,727 B1 | 7/2021 | Kumar |
| 2012/0203726 A1 | 8/2012 | Klabjan |
| 2016/0092959 A1 | 3/2016 | Gross |
| 2017/0091310 A1 | 3/2017 | Mohanlal et al. |
| 2018/0332582 A1 | 11/2018 | Bashir |
| 2019/0053013 A1* | 2/2019 | Markhovsky ............. G01S 5/06 |

(Continued)

OTHER PUBLICATIONS

Plus Codes, "Addresses for Everyone" (available at https://plus.codes, visited Aug. 17, 2020).

(Continued)

*Primary Examiner* — Kabir A Timory

(57) ABSTRACT

A system described herein may determine location information (e.g., two-dimensional location information) associated with an asset, generate or receive a first code based on the received location information, determine height information associated with the asset; generate a second code based on the first code and the height information; and store association information associating the first asset with the second code. The system may further receive a first request for location information associated with the asset; and output, in response to the first request, the second code, thus providing three-dimensional location information for the asset in response to the request.

20 Claims, 16 Drawing Sheets

(56) References Cited

U.S. PATENT DOCUMENTS

2020/0258174 A1    8/2020   Rodriguez
2020/0336923 A1   10/2020   Li et al.

OTHER PUBLICATIONS

Plus Codes, "How it Works" (available at https://plus.codes/howitworks, visited Aug. 17, 2020).
Plus Codes, "Benefits" (available at https://plus.codes/benefits, visited Aug. 17, 2020).
Plus Codes, "Frequently Asked Questions" (available at https://plus.codes/faq, visited Aug. 17, 2020).
Plus Codes, "For Businesses" (available at https://plus.codes/businesses, visited Aug. 17, 2020).

* cited by examiner

SYSTEMS AND METHODS FOR IDENTIFYING AVAILABLE SERVICES AT A PHYSICAL ADDRESS

CROSS-REFERENCE TO RELATED APPLICATION

This Application is a Continuation-in-Part of U.S. patent application Ser. No. 16/692,961, filed Nov. 22, 2019, titled "SYSTEMS AND METHODS FOR IDENTIFYING AVAILABLE SERVICES AT A PHYSICAL ADDRESS," the contents of which are incorporated herein in their entirety.

BACKGROUND

Many service providers regularly need to provide notifications to their service users (for example, for service status information) and prospective service users (for example, to attract new users, increase usage by existing users, and/or the like). Some services require infrastructure for the service provider to provide the services to a user (e.g., using equipment, systems, cabling, and the like), at a physical address. General notification strategies for a service provider may include delivery of notification material to the general public or to certain segments of the general public.

DETAILED DESCRIPTION OF PREFERRED EMBODIMENTS

Figure 1A:
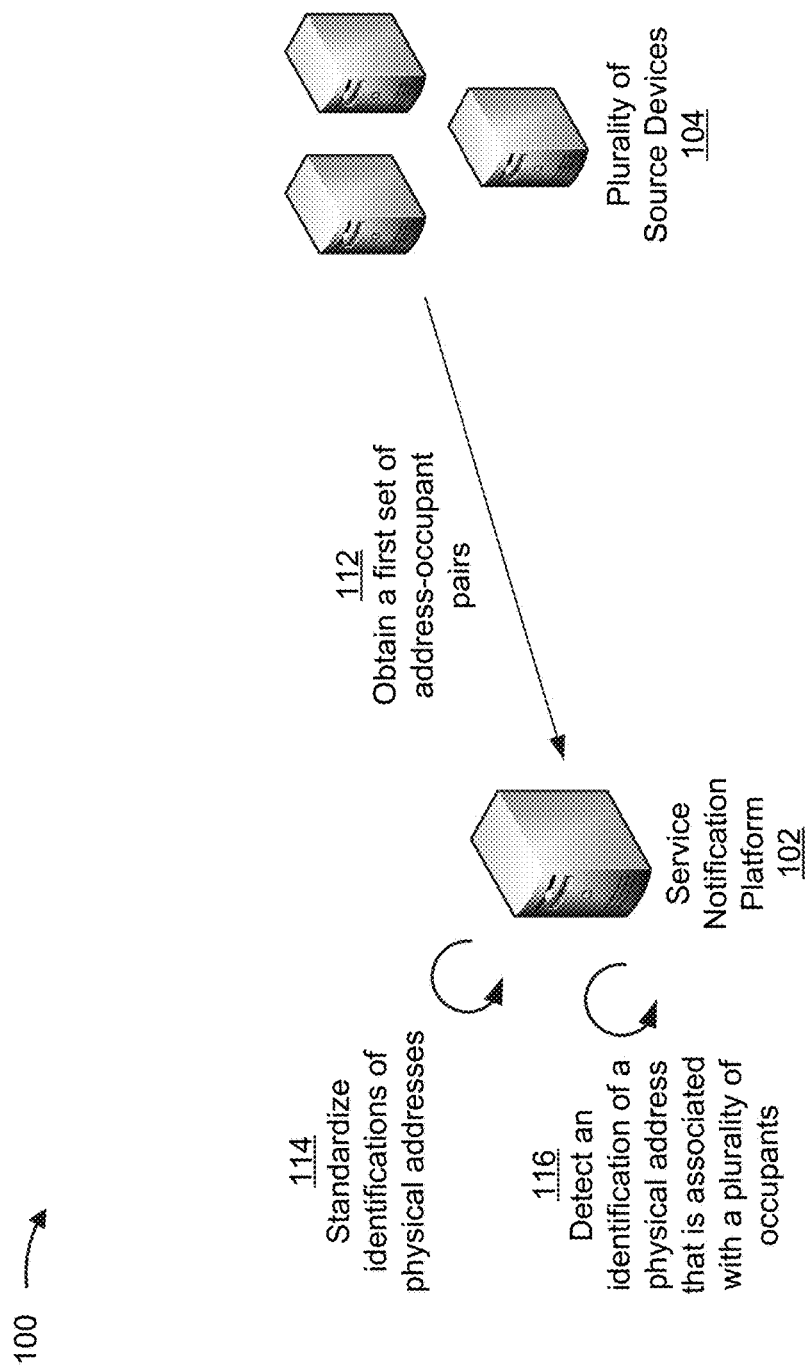
FIGS. 1A-1D are diagrams of one or more example implementations described herein.

The following detailed description of example implementations refers to the accompanying drawings. The same reference numbers in different drawings may identify the same or similar elements.

A service provider may have access to public address information via multiple source devices, multiple user data structures for multiple types of users, multiple notification data structures for multiple types of services, and/or the like, some of which may conflict in identifying physical addresses and associated occupants. With this conflicting information regarding occupants of physical addresses, notifying occupants of a service that is associated with infrastructure (e.g., one or more devices, media, and/or the like through which the service may be provided) is problematic. For example, accurate identification of prospective users that have access to the infrastructure is difficult.

If a service provider relies on physical systems to provide the service (e.g., fiber optic cables, metal-based cables, plumbing pipes, electrical lines, on-premises or near-premises equipment, and/or the like), the service provider wastes network and/or communication resources (e.g., processor resources, memory resources, communication resources, and/or the like) by providing notification materials to entities that do not have access to the infrastructure. For example, if a provider of a wireless data service that is associated with physical systems serving certain address ranges (e.g., a Fifth Generation ("5G") fixed wireless data service) is making the wireless data service available, it is more efficient to notify only those occupants that may access the wireless data service based on their address being within the address range serviced by the infrastructure systems associated with the wireless data service. Likewise, if a provider of a fiber optic data service that is associated with physical systems serving certain address ranges is making the fiber optic data service available, it is more efficient to notify only those occupants that may access the fiber optic data service based on their address or other location being within the coverage area (e.g., address range or other suitable coverage area) serviced by the infrastructure systems associated with the fiber optic data service.

According to some implementations described herein, a service notification platform may aggregate infrastructure information with a relatively accurate set of address-occupant pairs to improve efficiency in notification. The service notification platform may receive a first set of address-occupant pairs from a plurality of source devices. The address-occupant pairs may include identifications of physical addresses and identifications of occupants as identified by the plurality of source devices. Because the data may be old, and because the service notification platform receives address-occupant pairs from multiple sources, the first set of address-occupant pairs may have errors and/or duplicates.

To identify duplicates, the service notification platform may standardize the identifications of addresses (e.g., convert each of "123 N Front St.", "123 n Front Street", and "123 North Front St." to "123 North Front Street"). In this way, the service notification platform may determine whether different source devices agree on an occupant of a physical address. In some embodiments, as discussed below, the service notification platform may use and/or may generate one or more other types of identifiers in addition to, or in lieu of, physical addresses. Such identifiers may denote points or regions in three-dimensional space, and may be more granular than a physical address (e.g., may be referred to as a "sub-address"). For example, a set of such granular location identifiers may each denote a 3 meter by 3 meter by 3 meter cube, or some other three-dimensional shape, region, polygon, etc. For the sake of brevity, some examples described below are in the context of a "physical address." However, similar concepts may apply in embodiments that generate or otherwise make use of a more granular location identifier, which may in some situations represent a smaller or more specific two-dimensional region than a physical or postal address, and/or may represent a three-dimensional shape, region, polygon, etc. (e.g., a cube or some other three-dimensional polygon).

The service notification platform may identify an identification of a physical address and/or some other identifier of a geographic area or region, such as an identifier of a three-dimensional point, area, region, etc., that is associated with identifications of a plurality of the occupants. For example, the physical address may be associated with an identification of a first occupant and an identification of a second occupant. The service notification platform may select the first occupant to maintain association with the identification of the physical address. In some implementations, the service notification platform may select the first occupant based on a quantity of address-occupant pairs that identify the first occupant as being associated with the physical address. As similarly noted above, an "address-occupant pair" may, in some embodiments, refer to a pairing or correlation of one or more occupants that are associated with a particular granular location identifier, such as an identifier of a two-dimensional or three-dimensional area, region, etc., which may in some situations be different from a physical address. In some implementations, when the service notification platform selects an identification of an occupant to maintain association with an identification of an address, address-occupant pairs including the identification of the address may be given weights based on the source devices from which the address-occupant pairs were received. The service notification platform may discard address-occupant pairs that associate the identification of the address with an occupant that is different from the occupant identified in the selected identification. Duplicate address-occupant pairs may also be discarded.

As a result of discarding some of the address-occupant pairs, the service notification platform may create a second set of address-occupant pairs that is a refined set of address-occupant pairs, which may have improved accuracy when compared to the first set of address-occupant pairs.

The service notification platform may aggregate the second set of address-occupant pairs with infrastructure information that indicates one or more services that are provided, or available to be provided, at one or more of the physical addresses identified in the second set of address-occupant pairs. Based on the aggregate data, the service notification platform may perform actions related to notification of the one or more services to occupants that have access to the one or more services via the infrastructure. In some implementations, the service notification platform may recommend deployment of additional infrastructure based on the second set of address-occupant pairs.

By aggregating a relatively accurate set of address-occupant pairs and infrastructure information, the service notification platform may provide recommendations for efficient notifications related to services associated with the infrastructure. This may conserve networking and computing resources that might otherwise be used to generate and provide notification materials to entities that do not have access to the infrastructure. Additionally, by identifying the occupants to which the services are provided or available to be provided, the platform may provide information relating to selecting a service, of the available services, to identify in the notification material, to identify in user service interfaces, such as support portals, interactive voice response ("IVR") prompts, communications with service support personnel (e.g., a sales person), and/or the like. This may conserve network and/or computing resources that might otherwise be used to provide notification materials, determining the correct service within a user interface, and or the like without a specific location and/or service identification.

FIGS. 1A-1D are diagrams of one or more example implementations 100 described herein. As shown in FIGS. 1A-1D, the example implementation(s) 100 may include a notification platform 102, a plurality of source devices 104, a search engine device 106, a service provider device 108, a user management device 110, and/or the like.

As shown in FIG. 1A, and by reference number 112, the service notification platform 102 may obtain a first set of address-occupant pairs from the plurality of source devices 104. The plurality of source devices 104 may push address-occupant pairs (e.g., based on an update, expiration of a time period, and/or the like) or the service notification platform 102 may pull the first set of address-occupant pairs (e.g., via a request). The first set of address-occupant pairs include identifications of physical addresses and identifications of occupants. The plurality of source devices 104 may store, or have access to, information that associates individuals, businesses, and/or other entities that are considered occupants of spaces associated with physical addresses. For example, one or more of the plurality of source devices 104 may include a device associated with a government registry of businesses and associated addresses (e.g., a national or local business registry, a trademark registry, and/or the like), a device associated with a credit record entity (e.g., a credit bureau), a device associated with a private registry of businesses and associated addresses, and/or the like.

The plurality of sources devices 104 may provide the first set of address-occupant pairs in various formats. As received in the various formats, the first set of address-occupant pairs may be stored (e.g., in a data lake) to permit the first set of address-occupant pairs to be received and stored in their natural and/or raw format. The service notification platform 102 may use one or more connectors to filter and/or transform the first set of address-occupant pairs from their natural and/or raw format into a standard format and/or structure. Once the first set of address-occupant pairs have been transformed into a standard format and/or structure, the service notification platform 102 may import the first set of address-occupant pairs into a local, or accessible, data structure for further analysis.

The data structure may include a relational database management system, data analysis libraries, the one or more connectors, a distributed file system designed to run on commodity hardware, an internal search engine for finding data (e.g., particular address-occupant pairs and/or associated information) within the data structure, a user interface (e.g., for accessing data, modifying data, viewing data, and/or the like) within the data structure, an application programming interface for interfacing with other applications (e.g., a search engine, a map and/or direction service application, a notification delivery application, a telephone management application, an interactive sales application, an interactive website, and/or the like), and/or the like.

In some implementations, the identifications of physical addresses may include variations, such as different formats, styles, abbreviations, and/or the like. For example, a first source device may identify a physical address as "123 N Franklin St STE 200," a second source device may identify the same physical address as "123 North Franklin Street, Suite 200," a third source device may identify the same physical address as "123 N Franklin St., #200," and/or the like.

In some implementations, the identifications of occupants may include variations of the same occupant or a different occupant. For example, the first source device may identify an occupant as "Best Toy Company," the second source device may identify the occupant as "The Best Toy Company, Inc.," the third source device may identify the occupant as "The Tire Store," and/or the like. In some implementations, a source device may identify the occupant as a different occupant based on new or old information, relative to other source devices, or based on errors within data accessed by the source device.

As shown by reference number 114, the service notification platform 102 may standardize identifications of physical addresses. For example, the service notification platform 102 may translate identifications of the physical addresses into standardized identifications of the physical addresses. In some implementations, the service notification platform 102 may translate the identifications of the physical addresses using pairings of variations of an address element (e.g., "N.," "North," "No.,") with a standard address element ("N"). For example, the service notification platform may include an address matching component that is configured to match raw identifications of the physical addresses to standardized identifications of the physical addresses using a library and/or a list of raw identifications of physical addresses and associated standardized identifications of physical addresses. In some implementations, the service notification platform 102 may translate the identifications of the physical addresses by sending the identifications of the physical addresses to an address translation provider (e.g., a mapping device, a directions generation device, and/or the like).

In some implementations, the service notification platform 102 may separate each of the identifications of the physical addresses into an address and a sub-address. In some embodiments, as discussed below, the sub-address may be or may include one or more granular location identifiers that denote two-dimensional and/or three-dimensional areas, regions, etc. In this way, multiple occupants of a building may be associated with the same identification of a physical address associated with the building, while also being associated with different identifications of sub-addresses that indicate a unit within the building. This may be helpful for determining that multiple occupants are present within the building associated with the physical address, while also supporting removal of one or more conflicting identifications of occupants at the same sub-address.

The service notification platform 102 may assign one or more keys to an identification of a physical address. In some implementations, the service notification platform 102 may assign an address key that is associated with a building address and a sub-address key that is associated with a unit within the building address. In some embodiments, the address key and/or the sub-address key may be assigned based on standardized identifications. In some embodiments, as discussed below, the sub-address key may be, may include, and/or may otherwise be based on a granular location identifier, and may denote a three-dimensional area or region. Further, the granular location identifier may include a height or altitude component, such that the sub-location may be able to be located within three-dimensional space when compared to a reference altitude or height (e.g., sea level, ground level, and/or some other reference altitude or height).

As shown by reference number 116, the service notification platform 102 may detect an identification of a physical address that is associated with identifications of a plurality of occupants. For example, the identification of the physical address may be part of a first address-occupant pair with a first occupant (e.g., as received from a first source device) and the physical address may be part of a second address-occupant pair with a second occupant (e.g., as received from a second source device). In some implementations, the associations of the physical address with the plurality of occupants may be determined after standardizing the identifications of the physical addresses (e.g., one or both of the address or the sub-address).

In some implementations, the service notification platform 102 may use one or more fuzzy logic processes (e.g., many-valued logic processes to determine degrees of truth rather than simply true or false) to determine whether identifications of occupants are variations of the same occupant or different occupants. For example, the service notification platform 102 may use a fuzzy logic process to determine that "Best Toy Company" and "The Best Toy Company, Inc." are variations of the same occupant, but "The Tire Store" is a different occupant.

By detecting the association of the physical address with the plurality of occupants, the service notification platform 102 can detect a potential error within the first set of address-occupant pairs. The service notification platform 102 may then take steps to remove the errors to produce a refined, second set of address-occupant pairs. This may conserve computing and/or network resources that may otherwise be used to provide notification materials to incorrectly identified occupants of a building at a physical address and/or to provide notification materials to an entity that is not located at the physical address and does not have access to a service that is the subject of the notification materials.

Figure 1B:
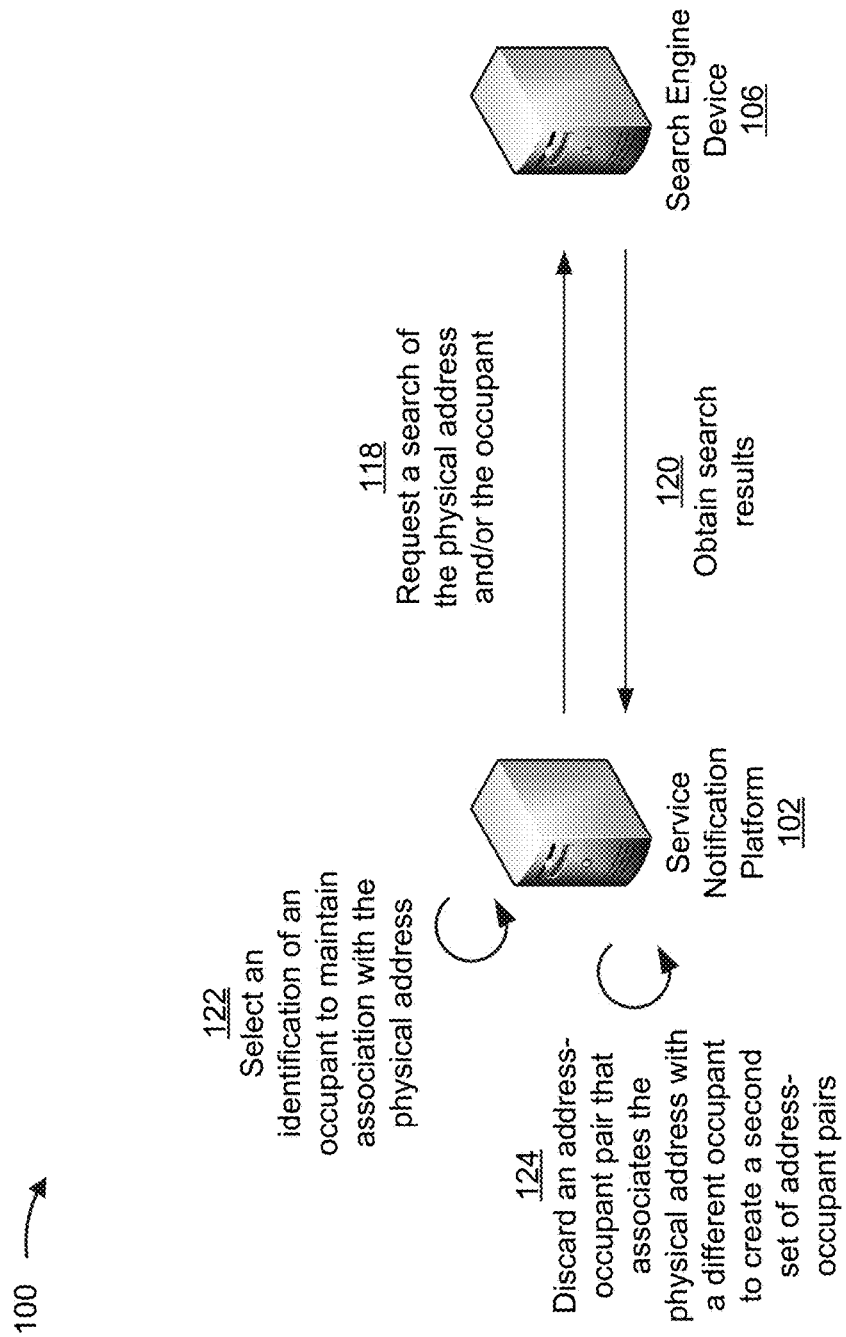

As shown in FIG. 1B, and by reference number 118, the service notification platform 102 may request a search based on the physical address, an identification of one or more of the identifications of the occupants that are associated with the physical address in the first set of address-occupant pairs, and/or the like. For example, the service notification platform 102 may perform one or more Internet searches based on the physical address, the first occupant, and/or the second occupant by providing the request to the search engine device 106.

As shown by reference number 120, the service notification platform 102 may obtain search results from the search engine device 106. The search results may include results of one or more searches (e.g., having different search terms, different search parameters, and/or the like). In some implementations, the results include map-based results (e.g., a result of a search for an address and/or an occupant within a map or navigation service) that indicate a location of an occupant and/or an occupant at a location on a map.

By performing one or more searches based on the physical address and/or identifications of possible occupants, the service notification platform 102 may obtain additional information that can be used to improve a likelihood of selecting an accurate address-occupant pair. Having an accurate address-occupant pair can avoid using computing resources and/or networking resources to provide notification materials to an entity that does not have access to the services that are the subjects of the notification materials.

As shown by reference number 122, the service notification platform 102 may select an identification of an occupant to maintain association with the physical address. For example, the service notification platform 102 may select the first occupant to maintain association with the identification of the physical address. The service notification platform 102 may use sub-address keys (e.g., which may be, may include, or may otherwise be based on granular location identifiers) to select the identification of the occupant to maintain association with the physical address.

In some implementations, the service notification platform 102 may select the identification of the occupant to maintain association with the physical address based on a quantity of the identifications of the plurality of the occupants that identify the first occupant. For example, if four address-occupant pairs including the physical address identify the first occupant and two of the address-occupant pairs including the physical address identify the second occupant, the service notification platform 102 may select the first occupant to maintain association with the physical address.

In some implementations, the service notification platform 102 may assign a confidence score to each selected identification of an occupant to maintain association with the physical address. In the example above, the service notification platform 102 may assign a confidence score of 67% (4/6) to the selection of the first occupant.

In some implementations, the service notification platform 102 may select the identification of the occupant to maintain association with the physical address based on a weighted scoring technique for analyzing the address-occupant pairs that identify the physical address. For example, the service notification platform 102 may assign values to the identifications of the occupants, and/or the associated applicant-occupant pairs, based on respective source devices from which the service notification platform 102 received the identifications of the occupants within the first set of address-occupant pairs. In some implementations, identifications of the occupants may receive a value based on a reliability score of the respective source devices from which the service notification platform 102 received the identifications of the occupants. A reliability score for a source device may be based on user input to the service notification platform 102, determined accuracy of historical identifications of occupants received from the source device, and/or the like.

In some implementations, the service notification platform 102 may determine accuracy of historical identifications of occupants based on a portion of historical identifications that match search results, match confirmations of occupants of a physical address (e.g., inputs by users that have been physically present to confirm an occupant of a physical address), match a majority or plurality of identifications of the plurality of source devices 104, and/or the like. The service notification platform 102 may use an accuracy determination model, trained using one or more machine learning processes with the historical identifications as inputs, to determine the values to assign to the identifications of the occupants such that relatively high values correspond to relatively high likelihoods of being accurate, based on historical identifications of occupants provided by the source devices from which the service notification platform 102 received the identifications of the occupants.

In implementations where the service notification platform 102 selects the identification of the occupant based on the weighted scoring technique, the service notification platform 102 may select the identification of the first occupant based on total values of the identifications of the plurality of the occupants. In an example of the weighted scoring technique, a first source device having a weight of 2, and a second source device having a weight of 2.3 may identify the first occupant as the occupant of the physical address. A third source device, having a weighted score of 0.5, a fourth source device, having a weighted score of 1.2, and a fifth source device, having a weighted score of 1.0, may identify the second occupant as the occupant of the physical address. The weighted scoring technique indicates that the first occupant should maintain association with the physical address based on a total score of identifications of the first occupant (4.3) being higher than the total score of identifications of the second occupant (2.7). In some implementations, one or more reliable source devices of the plurality of source devices 104 may be assigned a relatively high weighting such that, if the one or more reliable source devices provides an identification of the occupant of the physical address, the service notification platform 102 may have a high likelihood of maintaining association of the identification of the occupant, as identified by one or more reliable source devices, with the physical address. In this example of a weighted scoring technique, a confidence score for selecting the first occupant may be, for example, 61% (4.3/(4.3+2.7)).

In some implementations, the service notification platform 102 may use one or more machine learning processes to select the identification of the occupant to maintain association with the particular physical address. For example, the service notification platform 102 may use one or more artificial intelligence techniques, such as machine learning, deep learning, and/or the like to select the identification of an occupant to maintain association with the physical address. The service notification platform 102 may perform the one or more machine learning processes in connection with, or independently from, one or more of the techniques described above.

In some implementations, the service notification platform 102 may select the identification of the occupant to maintain association with the physical address using one or more inputs such as address-occupant pairs, historical accuracy of one or more source devices, geographical regions associated with an address in the address-occupant pairs, search results based on the physical address and/or the plurality of occupants, and/or the like. For example, the service notification platform 102 may train an occupant selection model using information that includes historical identifications of occupants from various source devices, related search results, and/or the like to select the identification of the occupant to maintain association with the physical address. As an example, the service notification platform 102 may determine that historical identifications of occupants from a particular source device are associated with a threshold probability of being an accurate identification of an occupant of a physical address. In some implementations, a determination of accuracy may be based on a verification process, such as receiving one or more inputs from a user that has been physically present to confirm an occupant, a user or user device that has received confirmation from the occupant, and/or the like.

In some implementations, the service notification platform 102 may use a scoring system (e.g., with relatively high scores and/or relatively low scores) to identify and/or classify parameters (e.g., inputs, combinations of inputs, and or the like) as being associated with one another. In this case, the service notification platform 102 may determine that a relatively high score (e.g., as being likely to influence the accuracy of an identification of an occupant) is to be assigned to parameters that are determined to be the same or similar as previously identified parameters that influenced the accuracy of identifications of occupants of physical addresses. In contrast, the service notification platform 102 may determine that a relatively low score (e.g., as being unlikely to influence the accuracy of an identification of an occupant) is to be assigned to parameters that are determined to be different than previously identified parameters that influenced the accuracy of identifications of occupants of physical addresses.

In some implementations, the service notification platform 102 may perform a training operation when generating the occupant selection model. For example, the service notification platform 102 may portion historical identifications of occupants and associated parameters into a training set (e.g., a set of data to train the occupant selection model), a validation set (e.g., a set of data used to evaluate a fit of the occupant selection model and/or to fine tune the occupant selection model), a test set (e.g., a set of data used to evaluate a final fit of the occupant selection model), and/or the like. In some implementations, the service notification platform 102 may preprocess and/or perform dimensionality reduction to reduce the historical identifications of occupants and the associated parameters to a minimum feature set. In some implementations, the service notification platform 102 may train the occupant selection model on this minimum feature set, thereby reducing processing to train the occupant selection model, and may apply a classification technique to the minimum feature set.

In some implementations, service notification platform 102 may use a classification technique, such as a logistic regression classification technique, a random forest classification technique, a gradient boosting machine learning ("GBM") technique, and/or the like, to determine a categorical outcome (e.g., that a parameter associated with an identification of an occupant corresponds to accuracy, that the parameter associated with the identification of an occupant does not correspond to accuracy, and/or the like). Additionally, or alternatively, the service notification platform 102 may use a naïve Bayesian classifier technique. In this case, the service notification platform 102 may perform binary recursive partitioning to split the data of the minimum feature set into partitions and/or branches and use the partitions and/or branches to perform predictions (e.g., that a parameter associated with the identification of an occupant corresponds to accuracy). Based on using recursive partitioning, the service notification platform 102 may reduce utilization of computing resources relative to manual, linear sorting and analysis of data items, thereby enabling use of thousands, millions, or billions of data items to train a model, which may result in a more accurate model than using fewer data items.

Additionally, or alternatively, the service notification platform 102 may use a support vector machine ("SVM") classifier technique to generate a non-linear boundary between data items in the training set. In this case, the non-linear boundary is used to classify test data (e.g., data relating to a source of an identification of the occupant, associated parameters, and/or the like) into a particular class (e.g., a class indicating that a parameter is likely to indicate that the identification of the occupant is likely to be accurate, that a parameter is likely to indicate that the identification of the occupant is unlikely to be accurate, and/or the like).

Additionally, or alternatively, the service notification platform 102 may train the occupant selection model using a supervised training procedure that includes receiving input to the occupant selection model from a subject matter expert, which may reduce an amount of time, an amount of processing resources, and/or the like to train the occupant selection model relative to an unsupervised training procedure. In some implementations, the service notification platform 102 may use one or more other model training techniques, such as a neural network technique, a latent semantic indexing technique, and/or the like. For example, the service notification platform 102 may perform an artificial neural network processing technique (e.g., using a two-layer feedforward neural network architecture, a three-layer feedforward neural network architecture, and/or the like) to perform pattern recognition with regard to patterns of whether parameters associated with historical identifications of occupants are likely to indicate that the identifications of occupants are accurate, are likely to indicate that the identifications of occupants are inaccurate, and/or the like. In this case, using the artificial neural network processing technique may improve an accuracy of the occupant selection model generated by the service notification platform 102 by being more robust to noisy, imprecise, or incomplete data, and by enabling the service notification platform 102 to detect patterns and/or trends undetectable to human analysts or systems using less complex techniques.

As an example, the service notification platform 102 may use a supervised multi-label classification technique to train the occupant selection model. For example, as a first step, the service notification platform 102 may map parameters to accuracy of identifications of occupants. In this case, the parameters may be characterized as corresponding to accurate identifications of occupants, based on characteristics of the parameters (e.g., whether a characteristic of a parameter is similar or associated with accurate identifications of occupants) and an analysis of the parameters (e.g., by a technician, thereby reducing processing relative to the service notification platform 102 being required to analyze each activity).

As a second step, the service notification platform 102 may determine classifier chains, whereby labels of target variables may be correlated (e.g., in this example, labels may be parameters, and correlation may refer to a common characteristic of the parameters in similarly accurate identifications of occupants). In this case, the service notification platform 102 may use an output of a first label as an input for a second label (as well as one or more input features, which may be other data relating to the identifications of occupants), and may determine a likelihood that a particular parameter that includes a set of characteristics (some of which are associated with historical identifications of occupants that were determined to be accurate, and some of which are associated with historical identifications of occupants that were determined to be inaccurate) is associated with accuracy of identifications of occupants based on a similarity to other parameters that include similar characteristics. In this way, the service notification platform 102 transforms classification from a multilabel-classification problem to multiple single-classification problems, thereby reducing processing utilization. As a third step, the service notification platform 102 may determine a Hamming Loss Metric relating to an accuracy of a label in performing a classification by using the validation set of the data. For example, an accuracy with which a weighting is applied to each parameter and whether each parameter is associated with an accurate or an inaccurate identification of an occupant, results in a correct prediction of whether an identification of an occupant is accurate, thereby accounting for differing amounts to which association of any one parameter influences the accuracy of the identification of the occupant.

As a fourth step, the service notification platform 102 may finalize the occupant selection model based on labels that satisfy a threshold accuracy associated with the Hamming Loss Metric and may use the occupant selection model for subsequent prediction of whether parameters of an identification of an occupant are to result in the identification of the occupant being accurate.

As another example, the service notification platform 102 may determine, using a linear regression technique, that a threshold percentage of parameters, in a set of parameters, do not correspond to accuracy of an identification of an occupant, and may determine that those parameters are to receive relatively low association scores. In contrast, the service notification platform 102 may determine that another threshold percentage of parameters correspond to accuracy (indicating accuracy or inaccuracy) and may assign a relatively high association score to those parameters. Based on the parameters corresponding to accuracy of an identification of an occupant, the service notification platform 102 may generate the occupant selection model and may use the occupant selection model for analyzing new parameters that the service notification platform 102 identifies.

In some implementations, a different device, such as a server device, may generate and train the occupant selection model. The different device may send the occupant selection model for use by the service notification platform 102. The different device may update and send (e.g., on a scheduled basis, on an on-demand basis, on a triggered basis, on a periodic basis, and/or the like) the occupant selection model to the service notification platform 102.

Accordingly, the service notification platform 102 may use any number of artificial intelligence techniques, machine learning techniques, deep learning techniques, and/or the like to select an identification of an occupant to maintain association with the physical address.

As shown by reference number 124, the service notification platform 102 may discard, from the first set of address-occupant pairs, one or more address-occupant pairs that associate the physical address with an identification of an occupant that is not the selected identification of the occupant. For example, the service notification platform 102 may discard one or more address-occupant pairs that include an identification of the second occupant. In some implementations, the service notification platform 102 may discard one or more address-occupant pairs that associate a sub-address key (e.g., assigned to the physical address) with the identification of an occupant that is not the selected identification of the occupant.

By selecting the identification of the occupant to maintain association with the physical address and discarding conflicting identifications of occupants (and/or associated address-occupant pairs) the service notification platform 102 may create a second set of address-occupant pairs. The second set of address-occupant pairs may have a reduced quantity of conflicting address-occupant pairs, may include identifications of physical addresses that have improved accuracy, and/or the like. The second set of address-occupant pairs may improve efficiency in providing notification materials associated with service status, available services, and/or the like. Using the second set of address-occupant pairs may avoid using computing and/or network resources to send notifications to entities associated with the conflicting address-occupant pairs, which may be unlikely to be at the physical address and which may not be users of the service or have access to associated infrastructure to provide the services that are the subjects of the notification.

Figure 1C:
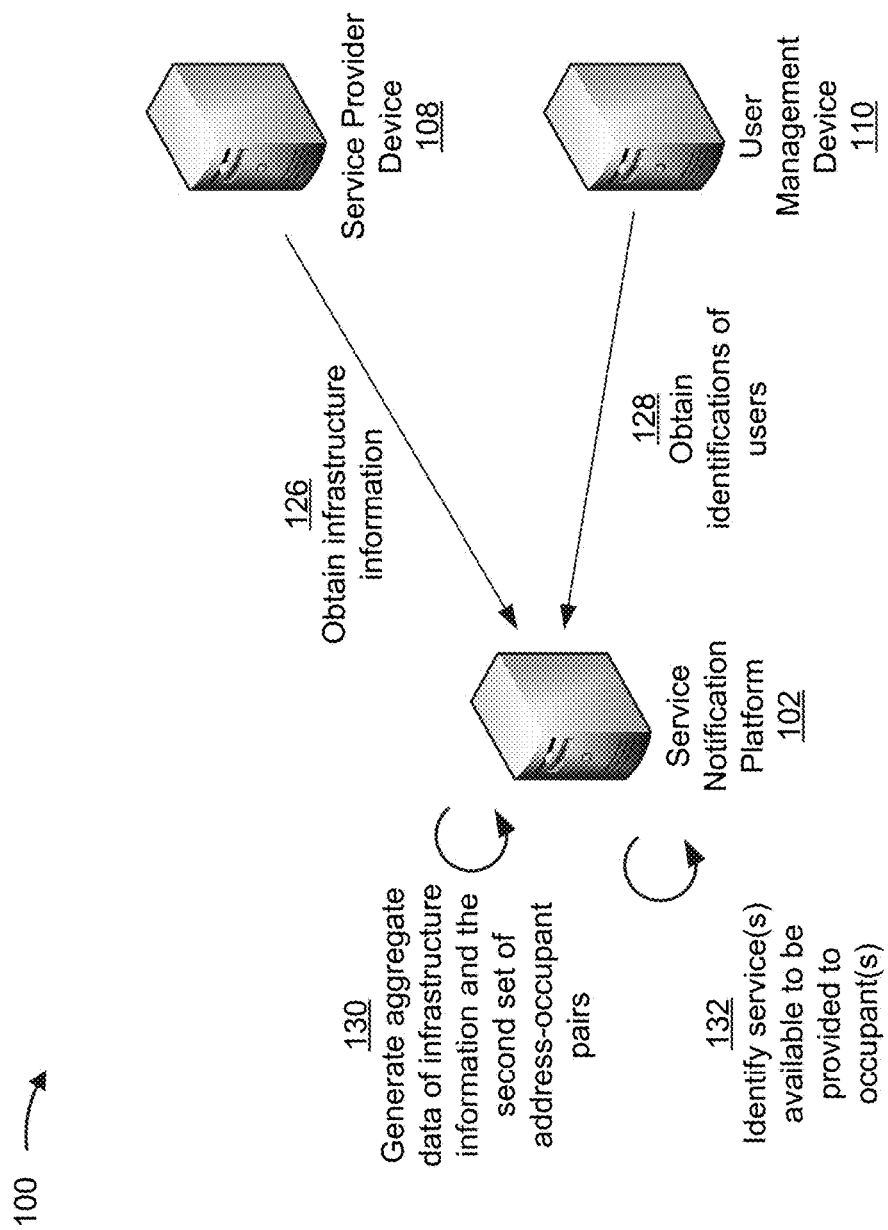

As shown in FIG. 1C, and by reference number 126, the service notification platform 102 may obtain infrastructure information from the service provider device 108. The infrastructure information may indicate one or more services that are available to be provided at physical addresses (e.g., one or more of the physical addresses identified in the second set of address-occupant pairs). In some embodiments, the infrastructure information may indicate one or more services that are available to be provided at a sub-address.

In some implementations, the infrastructure information lists physical addresses (e.g., associated with an address-key) that have access to the infrastructure associated with the service provider (e.g., through which the service provider may provide services). In some implementations, the infrastructure information may list ranges of physical addresses that have access to the infrastructure (e.g., 100-500 N Main St.). Additionally, or alternatively, the infrastructure information may identify geographical regions that have access to the infrastructure, or for which a cost to provide access would be relatively inexpensive (e.g., based on being within a threshold distance from existing physical infrastructure). In some embodiments, the infrastructure information may identify sub-addresses, which may represent three-dimensional regions, points, areas, etc. The generation or determination of such three-dimensional sub-addresses is discussed in greater detail below.

The infrastructure may comprise one or more physical systems such as fiber optic cables, metal-based cables, plumbing pipes, electrical lines, on-premises or near-premises equipment, and/or the like. When the infrastructure comprises one or more physical systems, an occupant may gain access to a service from the service provider by connecting to the infrastructure. The infrastructure may comprise one or more ranged components, such as a network node configured to provide wireless communication (e.g., a cell of a wireless network). When the infrastructure comprises one or more ranged components, the occupant may gain access to a service from the service provider via a wireless connection between physical systems (e.g., an air interface).

As shown by reference number 128, the service notification platform 102 may obtain identifications of users from the user management device 110. For example, the identifications of users may include one or more identifications of entities (e.g., occupants), identifications of one or more services to which the users are or were subscribed, identifications of physical addresses of the users at which the service provider provides or has provided services, identifications of sub-addresses associated with the users, and/or the like. For example, the identifications of users may include an entity name (e.g., "Entity A"), a service currently provided via the infrastructure (e.g., fiber optic-based Internet services), and one or more addresses of the entity at which the service is currently provided (e.g., 123 Main St., Arlington, Va. and 321 South State St., Fairfax, Va.). The identifications of users may identify additional addresses of the entity at which the service is not provided (e.g., at which a different service is provided or at which the service had previously been provided).

The service notification platform 102 may determine one or more associations between the users and one or more occupants in the second set of address-occupant pairs, for which one or more services are available to be provided by the service provider. In this way, the service notification platform 102 may efficiently identify notifications for service status and service availability (e.g., notifications with a relatively high likelihood of being meaningful to the recipient). For example, an existing user of a service at one physical address may be relatively likely (e.g., when compared to the general public) to desire notifications for service availability at another physical address associated with the user. This association information may be used to conduct efficient notifications of specific available services and locations, which may conserve computing and networking resources that may otherwise be used for doing notifications in a wide, general fashion that may not be relevant to many of the recipients.

The service notification platform 102 may perform updates to the second set of address-occupant pairs (e.g., perform a process of selecting an identification of an occupant to maintain association with the physical address). The service notification platform 102 may perform updates based on trigger events such as expiration of a time period from a most recent update for a particular physical address, expiration of a time period from a most recent update of the second set of address-occupant pairs (e.g., daily, weekly, monthly, quarterly, or yearly updates), reception of an indication that a previously selected occupant of a physical address is not the actual occupant of the physical address, reception of new and/or replacement address-occupant pairs from one or more of the plurality of source devices 104, and/or the like. In some implementations, the service notification platform 102 may perform updates based on receiving input from a user device. For example, the service notification platform 102 may perform updates based on receiving a request for notifications related to a particular available service at a particular address, within a range of addresses, within a geographical region, and/or the like.

By performing updates to the second set of address-occupant pairs based on trigger events, the second set of address-occupant pairs may be adaptable to changed information and may maintain the second set of address-occupant pairs with an improved accuracy when compared to a static determination of the second set of address-occupant pairs.

As shown by reference number 130, the service notification platform 102 may generate aggregate data that includes infrastructure information and the second set of address-occupant pairs. The aggregate data may be used to identify one or more services that are available (e.g., based on the infrastructure information) at one or more physical addresses that are identified in the second set of address-occupant pairs. The aggregate data may also be used to identify occupants that are associated with the one or more physical addresses at which the one or more services are available. In some implementations, the identifications of users may be included in the aggregate data to further identify one or more physical addresses associated with an existing or former users at which infrastructure makes one or more services available to be provided.

As shown by reference number 132, the service notification platform 102 may identify one or more services that are available to be provided to one or more occupants. For example, the service notification platform 102 may use the aggregate data to identify a service that is not currently provided to an occupant of a physical address that has access to the infrastructure. In some implementations, the service notification platform 102 may identify a service to be included in a notification based on one or more characteristics of the occupant. For example, if the occupant is associated with an entity that is a current or former user, the service notification platform 102 may identify the service provided to the entity at a different physical address.

In some implementations, the service notification platform 102 may use one or more machine learning processes, as discussed herein, to generate a model for selecting services to provide to occupants. The model may be trained using inputs associated with historical selections of services provided to occupants, such as geographical regions of the physical addresses, types of businesses operated by the occupants, and/or the like.

The service notification platform 102 may provide an interface (e.g., an application programming interface, an interactive website, and/or the like) to provide access to the second set of address-occupant pairs, the aggregate data, the identified services that are available to be provided to the one or more occupants, and/or the like. For example, a service system associated with the service provider may provide a query using the interface for prospective and/or existing users within an address range that has access to existing infrastructure of the service provider. The service notification platform 102 may query a data structure storing the one or more application-occupant pairs based on addresses that are within the address range and/or within the address range and also having access to existing infrastructure of the service provider. The service notification platform 102 may provide the results of the query in an organized and/or filtered format. For example, the service notification platform 102 may provide the results of the query in an ordered list based on a likelihood of relevance of an associated notification of the services to the occupants associated with the addresses that are within the address range. The results may include information such as types of infrastructure, capabilities of the infrastructure (e.g., a quantity of available ports), identifications of available services, information about the prospective and/or existing users (e.g., an occupant type, a business type, and/or the like), and/or the like. The results may be provided in any format typically used to return a result from an interface, such as JSON, XML, HTML and the like.

By providing the interface to access the second set of address-occupant pairs, a user device associated with the service provider may identify recommendations of prospective and/or existing users for efficient notifications related to services associated with the infrastructure. This may also conserve networking and computing resources that might otherwise be used to generate and provide notification materials to entities that do not have access to the infrastructure.

Figure 1D:
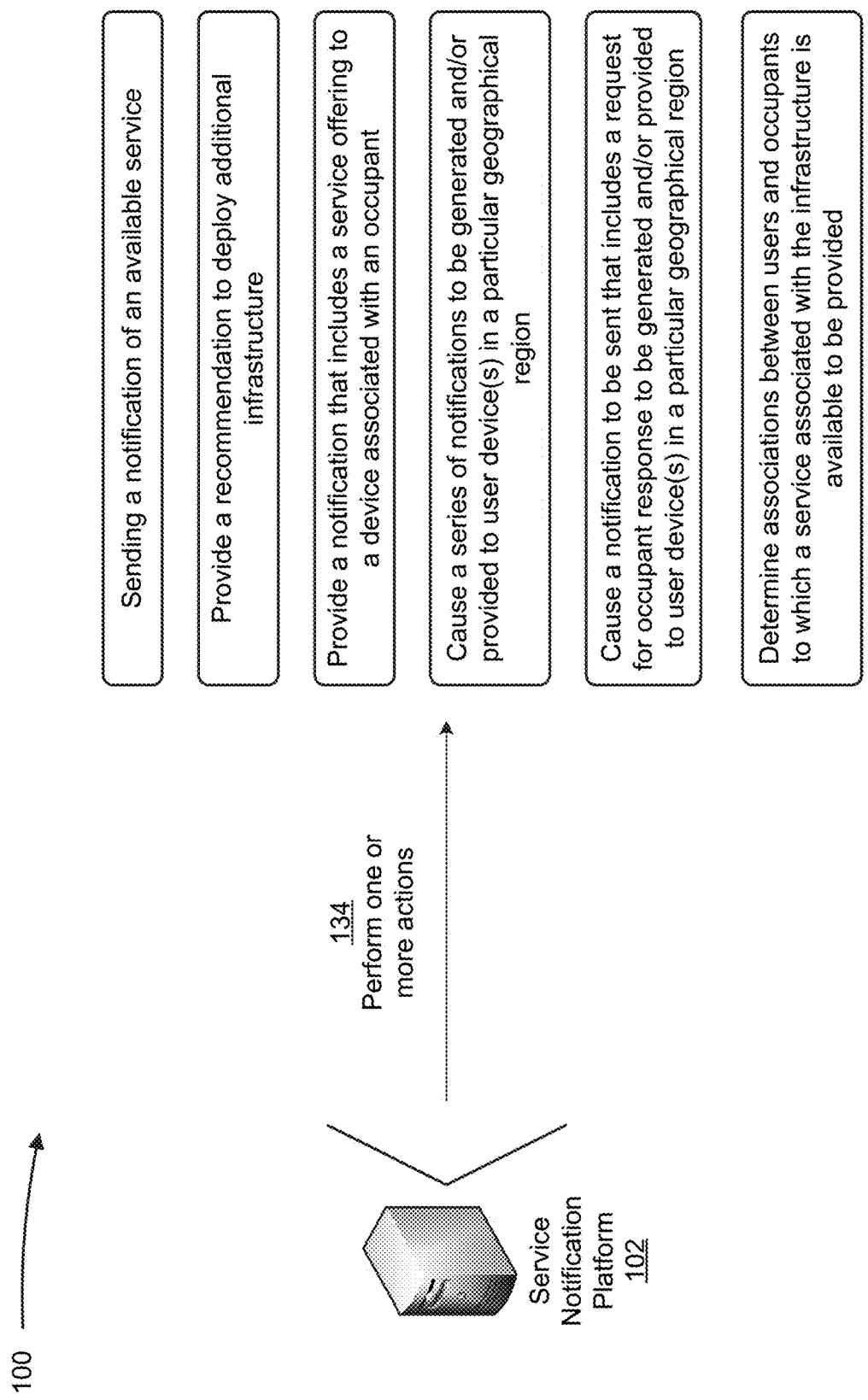

As shown in FIG. 1D, and by reference number 134, the service notification platform 102 may perform one or more actions. In some implementations, the service notification platform 102 may perform one or more actions based on identifying the one or more services being provided or available to be provided at the one or more physical locations.

The one or more actions may include sending a notification of an available service. For example, the service notification platform 102 may provide a notification of the availability of one or more services to one or more user devices associated with the one or more occupants for which the one or more services are available to be provided via the infrastructure. In some implementations, the service notification platform 102 may provide the notification based on identification of one or more services that are available to be provided to the one or more of the occupants. In some implementations, the service notification platform 102 may provide the notification based on one or more associations between the one or more occupants and one or more users identified in the identifications of users.

In some implementations, the service notification platform 102 may provide a list of one or more notifications related to a service to display via the user device (e.g., a user device associated with the service provider). The list may be prioritized based on likelihood of relevance to the user of the notification, for example, based on the user's subscription to the service or the availability of the service at a location associated with the user. The likelihood of relevance may be determined using a model trained using one or more machine learning processes that have been trained using inputs such as historical outcomes of providing notifications to user devices and associated parameters (e.g., whether the occupants are associated with current users, types of services, geographical regions associated with the physical addresses, types of businesses operated by the occupants, and/or the like).

The one or more actions may include providing a recommendation to deploy additional infrastructure. For example, the service notification platform 102 may determine that deploying additional infrastructure on one or more streets or in a geographical region would provide access to a threshold quantity of occupants with a threshold likelihood of relevance of interest in a service. In some implementations, the service notification platform 102 may provide the recommendation to deploy the additional infrastructure based on one or more associations between at least one occupant of the second set of address-occupant pairs, for which the one or more services are not available to be provided, and one or more users identified in the identifications of users.

In some implementations, the service notification platform 102 may determine the likelihood of relevance of a notification based on historical outcomes of providing notifications related to the service for similar occupants. In some implementations, the service notification platform 102 may use a model trained using one or more machine learning processes to determine a likelihood that a notification to a prospective user (e.g., the occupants that would gain access to the service from the additional infrastructure) would be relevant to the prospective user (and in some cases the likelihood the prospective user would choose to subscribe to the service). The service notification platform 102 or another device may train the model with inputs such as types of businesses operated by the occupants, geographical regions associated with the physical addresses, demographics of geographical regions associated with the physical addresses, economic indicators of the geographical regions associated with the physical addresses, population growth of the geographical regions associated with the physical addresses, and/or the like.

The one or more actions may include providing a notification that includes a service offering to a device associated with an occupant. For example, the service notification platform 102 may provide a notification that includes information related to an available service to a device associated with the one or more occupants for which the service is available to be provided via the infrastructure. The notification may exclude those occupants that are already indicated as users of the service, or may include different information related to the service depending on the user's status (e.g., service levels, usage levels).

The one or more actions may include causing a series of notifications to be generated and/or provided to one or more user devices in a particular geographical region. For example, the service notification platform 102 may generate, or provide information to cause another device to generate, notifications to one or more user devices associated with the occupants for which the one or more services are provided or are available to be provided via the infrastructure. In some implementations, the notification may provide information on different services based on types of businesses operated by the occupants, types of infrastructure available at the physical addresses of the occupants, and/or the like. For example, users that currently subscribe to the service may receive information related to upcoming changes in the services (e.g., improvements, service outages), while prospective users may receive information related to service availability and capabilities.

The one or more actions may include causing a notification to be sent that includes a request for occupant response to be generated and/or provided to one or more user devices in a particular geographical region. For example, the service notification platform 102 may generate, or provide information to cause another device to generate, a notification to a user device associated with an occupant requesting that the occupant respond with certain information, such as confirmation of address or other information associated with a user, confirmation of the presence of infrastructure at the address, feedback on services provided, desire for services, and the like. Responses to the occupant satisfaction survey may be used to validate and train address information determinations described above, inform recommendations to deploy additional infrastructure to support additional service availability, and/or the like.

The one or more actions may include determining associations between users (e.g., current and/or former users) and occupants to which a service associated with the infrastructure is available to be provided. As described above, the associations may be included with the aggregate data. In other implementations, the associations may be determined after generating the aggregate data.

As described above, by generating the aggregate data of infrastructure information and the second set of address-occupant pairs, having improved accuracy relative to the first set of address-occupant pairs received from the plurality of source devices 104, the service notification platform 102 is able to perform one or more actions to assist in efficient use of computing and/or network resources to generate and/or provide notifications for entities that have access to an associated service via infrastructure. Using the aggregate data for notifications avoids consumption of computing and/or network resources that would otherwise be wasted in notification efforts provided for entities that do not have access to the associated service via the infrastructure.

As indicated above, FIGS. 1A-1D are provided merely as one or more examples. Other examples may differ from what is described with regard to FIGS. 1A-1D. For example, in practice, there may be networks between the devices, additional devices, fewer devices, different devices, or differently arranged devices than those shown in FIGS. 1A-1D.

Figure 2:
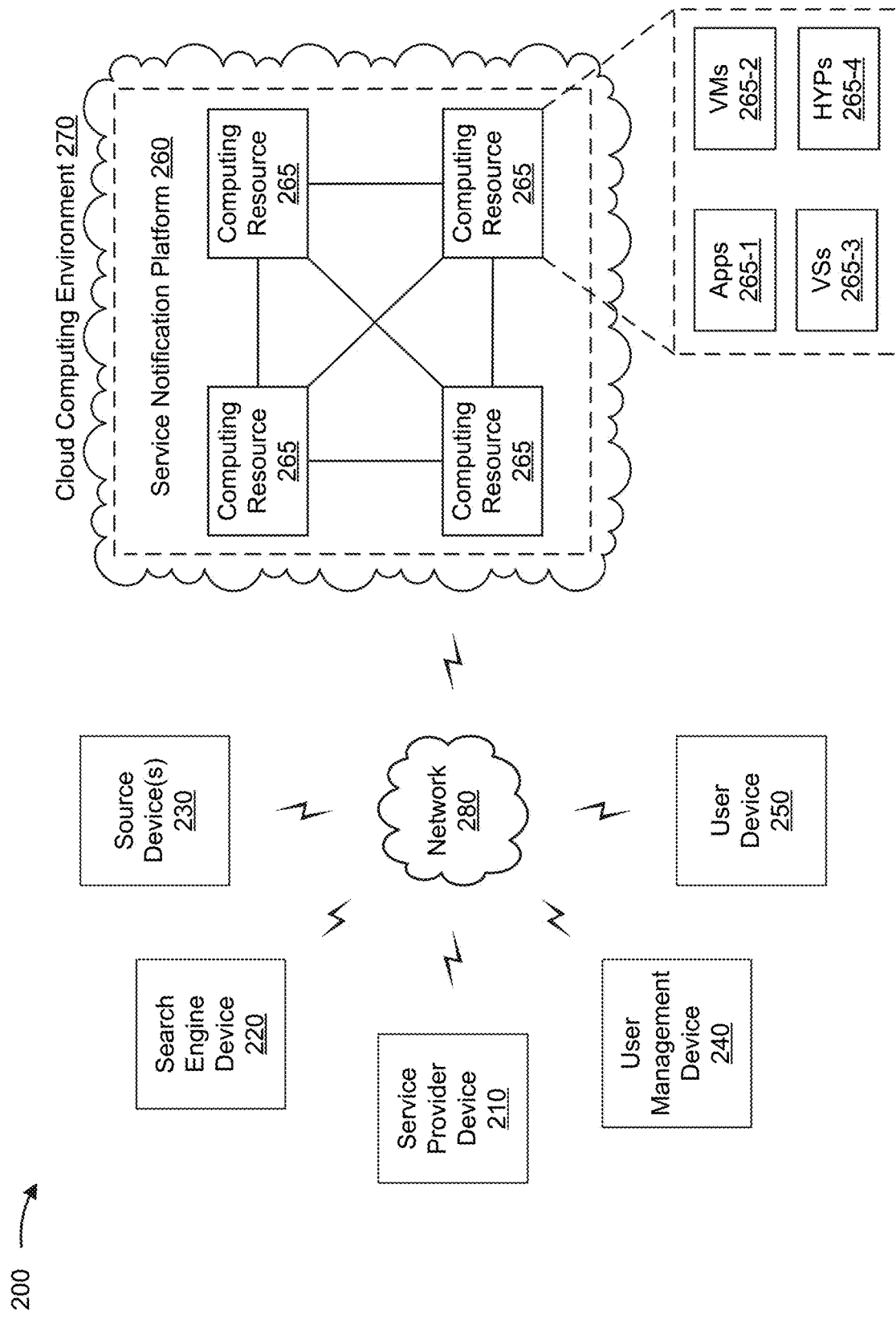
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a service provider device 210, a search engine device 220, a source device 230, a user management device 240, a user device 250, a service notification platform 260, a computing resource 265, a cloud computing environment 270, and a network 280. Devices of environment 200 may interconnect via wired connections, wireless connections, or a combination of wired and wireless connections.

Service provider device 210 (e.g., the service provider device 108) includes one or more devices capable of receiving, storing, processing, and/or routing information associated with generating and/or providing infrastructure information to service notification platform 260. In some implementations, service provider device 210 may include a communication interface that allows service provider device 210 to receive information from and/or transmit information to other devices in environment 200. For example, service provider device 210 may use the communication interface to provide the infrastructure information to service notification platform 260.

Search engine device 220 (e.g., the service provider device 108) includes one or more devices capable of receiving, storing, processing, and/or routing information associated with executing a search. Search engine device 220 may be configured to crawl a corpus of documents (e.g., web documents, maps, and/or the like), index the documents, and store information associated with the documents in a repository of documents. When executing the search, search engine device 220 may search the corpus of documents, the index of the documents, the repository of documents, and/or the like. In some implementations, search engine device 220 may include a communication interface that allows search engine device 220 to receive information from and/or transmit information to other devices in environment 200. For example, search engine device 220 may use the communication interface to receive search terms (e.g., identifications of addresses and/or identifications of occupants) from service notification platform 260 and provide search results to service notification platform 260.

Source device 230 (e.g., one of the plurality of source devices 104) includes one or more devices capable of receiving, storing, processing, and/or routing information associated with generating and/or providing address-occupant pairs to service notification platform 260. In some implementations, source device 230 may include a communication interface that allows source device 230 to receive information from and/or transmit information to other devices in environment.

User management device 240 (e.g., the user management device 110) includes one or more devices capable of receiving, storing, processing, and/or routing information associated with storing, generating, and/or providing identifications of users associated with the service provider. In some implementations, user management device 240 may include a communication interface that allows user management device 240 to receive information from and/or transmit information to other devices in environment.

User device 250 includes one or more devices capable of receiving, generating, storing, processing, and/or providing information associated with receiving notifications from service notification platform 260. For example, user device 250 may include a communication and/or computing device, such as a mobile phone (e.g., a smart phone, a radiotelephone, and/or the like), a laptop computer, a tablet computer, a handheld computer, a desktop computer, a gaming device, a wearable communication device (e.g., a smart wristwatch, a pair of smart eyeglasses, and/or the like), or a similar type of device.

Service notification platform 260 includes one or more computing resources assigned to identify systems and methods for identifying available services at a physical address. For example, service notification platform 260 may be a platform implemented by cloud computing environment 270 that may identify available services at the physical address. In some implementations, service notification platform 260 is implemented by computing resources 265 of cloud computing environment 270.

Service notification platform 260 may include a server device or a group of server devices. In some implementations, service notification platform 260 may be hosted in cloud computing environment 270. Notably, while implementations described herein may describe service notification platform 260 as being hosted in cloud computing environment 270, in some implementations, service notification platform 260 may be non-cloud-based or may be partially cloud-based.

Cloud computing environment 270 includes an environment that delivers computing as a service, whereby shared resources, services, and/or the like may be provided to identify available services at a physical address. Cloud computing environment 270 may provide computation, software, data access, storage, and/or other services that do not require end-user knowledge of a physical address and configuration of a system and/or a device that delivers the services. As shown, cloud computing environment 270 may include service notification platform 260 and computing resource 265.

Computing resource 265 includes one or more personal computers, workstation computers, server devices, or another type of computation and/or communication device. In some implementations, computing resource 265 may host service notification platform 260. The cloud resources may include compute instances executing in computing resource 265, storage devices provided in computing resource 265, data transfer devices provided by computing resource 265, and/or the like. In some implementations, computing resource 265 may communicate with other computing resources 265 via wired connections, wireless connections, or a combination of wired and wireless connections.

As further shown in FIG. 2, computing resource 265 may include a group of cloud resources, such as one or more applications ("APPs") 265-1, one or more virtual machines ("VMs") 265-2, virtualized storage ("VSs") 265-3, one or more hypervisors ("HYPs") 265-4, or the like.

Application 265-1 includes one or more software applications that may be provided to or accessed by user device 250. Application 265-1 may eliminate a need to install and execute the software applications on user device 250. For example, application 265-1 may include software associated with service notification platform 260 and/or any other software capable of being provided via cloud computing environment 270. In some implementations, one application 265-1 may send/receive information to/from one or more other applications 265-1, via virtual machine 265-2.

Virtual machine 265-2 includes a software implementation of a machine (e.g., a computer) that executes programs like a physical machine. Virtual machine 265-2 may be either a system virtual machine or a process virtual machine, depending upon use and degree of correspondence to any real machine by virtual machine 265-2. A system virtual machine may provide a complete system platform that supports execution of a complete operating system ("OS"). A process virtual machine may execute a single program and may support a single process. In some implementations, virtual machine 265-2 may execute on behalf of a user (e.g., user device 250), and may manage infrastructure of cloud computing environment 270, such as data management, synchronization, or long-duration data transfers.

Virtualized storage 265-3 includes one or more storage systems and/or one or more devices that use virtualization techniques within the storage systems or devices of computing resource 265. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 265-4 provides hardware virtualization techniques that allow multiple operating systems (e.g., "guest operating systems") to execute concurrently on a host computer, such as computing resource 265. Hypervisor 265-4 may present a virtual operating platform to the guest operating systems and may manage the execution of the guest operating systems. Multiple instances of a variety of operating systems may share virtualized hardware resources.

Network 280 includes one or more wired and/or wireless networks. For example, network 280 may include a cellular network (e.g., a long-term evolution ("LTE") network, a code division multiple access ("CDMA") network, a 3G network, a 4G network, a 5G network, another type of next generation network, and/or the like), a public land mobile network ("PLMN"), a local area network ("LAN"), a wide area network ("WAN"), a metropolitan area network ("MAN"), a telephone network (e.g., the Public Switched Telephone Network ("PSTN")), a private network, an ad hoc network, an intranet, the Internet, a fiber optic-based network, a cloud computing network, and/or the like, and/or a combination of these or other types of networks.

The number and arrangement of devices and networks shown in FIG. 2 are provided as one or more examples. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
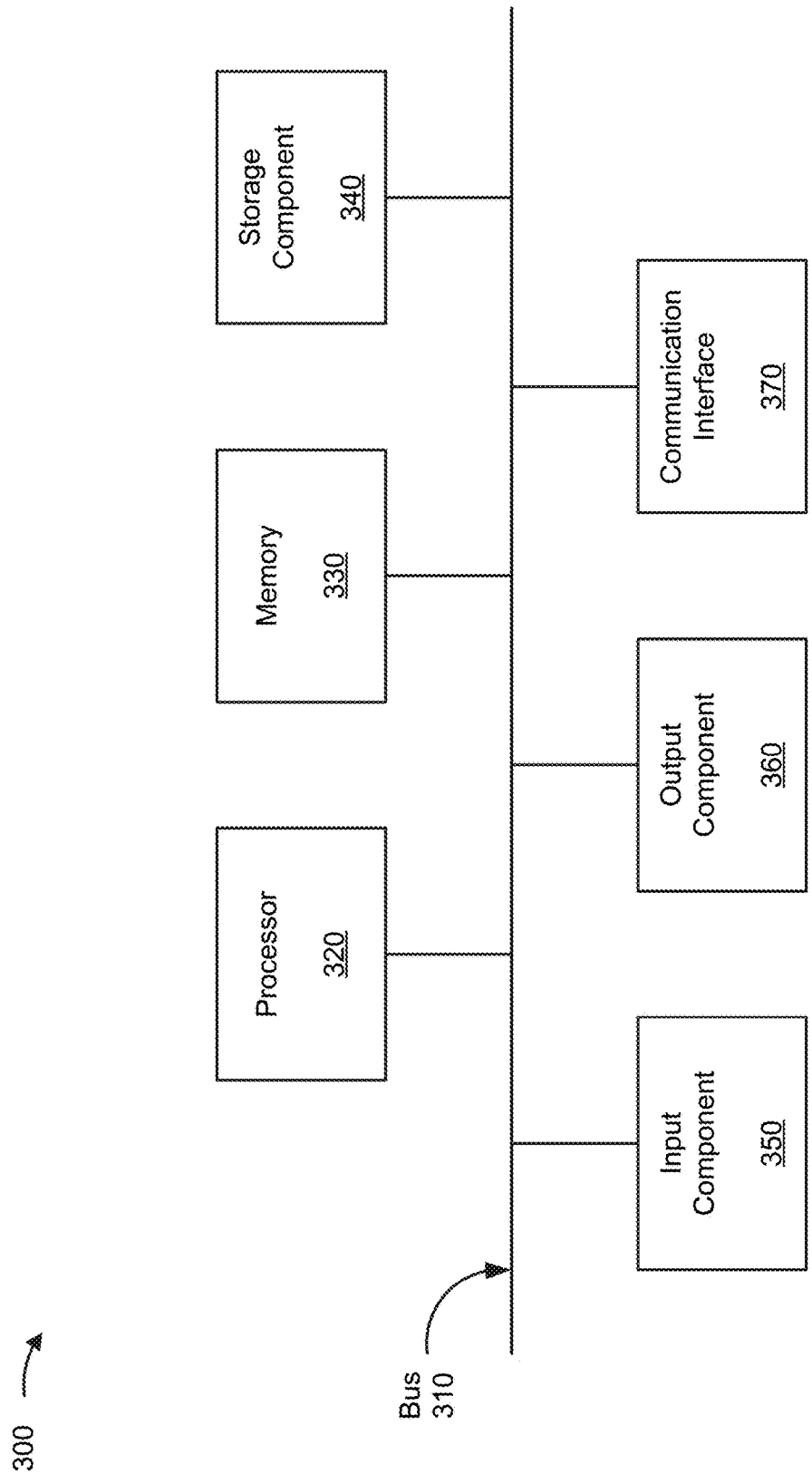
FIG. 3 is a diagram of example components of one or more devices of FIG. 2.

FIG. 3 is a diagram of example components of a device 300. Device 300 may correspond service provider device 210, search engine device 220, source device 230, user management device 240, user device 250, service notification platform 260, and/or computing resource 265. In some implementations, service provider device 210, search engine device 220, source device 230, user management device 240, user device 250, service notification platform 260, and/or computing resource 265 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among multiple components of device 300. Processor 320 is implemented in hardware, firmware, and/or a combination of hardware and software. Processor 320 is a central processing unit ("CPU"), a graphics processing unit ("GPU"), an accelerated processing unit ("APU"), a microprocessor, a microcontroller, a digital signal processor ("DSP"), a field-programmable gate array ("FPGA"), an application-specific integrated circuit ("ASIC"), or another type of processing component. In some implementations, processor 320 includes one or more processors capable of being programmed to perform a function. Memory 330 includes a random access memory ("RAM"), a read only memory ("ROM"), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, and/or a magneto-optic disk), a solid state drive ("SSD"), a compact disc ("CD"), a digital versatile disc ("DVD"), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a component for determining location (e.g., a global positioning system ("GPS") component) and/or a sensor (e.g., an accelerometer, a gyroscope, an actuator, another type of positional or environmental sensor, and/or the like). Output component 360 includes a component that provides output information from device 300 (via, e.g., a display, a speaker, a haptic feedback component, an audio or visual indicator, and/or the like).

Communication interface 370 includes a transceiver-like component (e.g., a transceiver, a separate receiver, a separate transmitter, and/or the like) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a wireless local area network interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. As used herein, the term "computer-readable medium" refers to a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardware circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
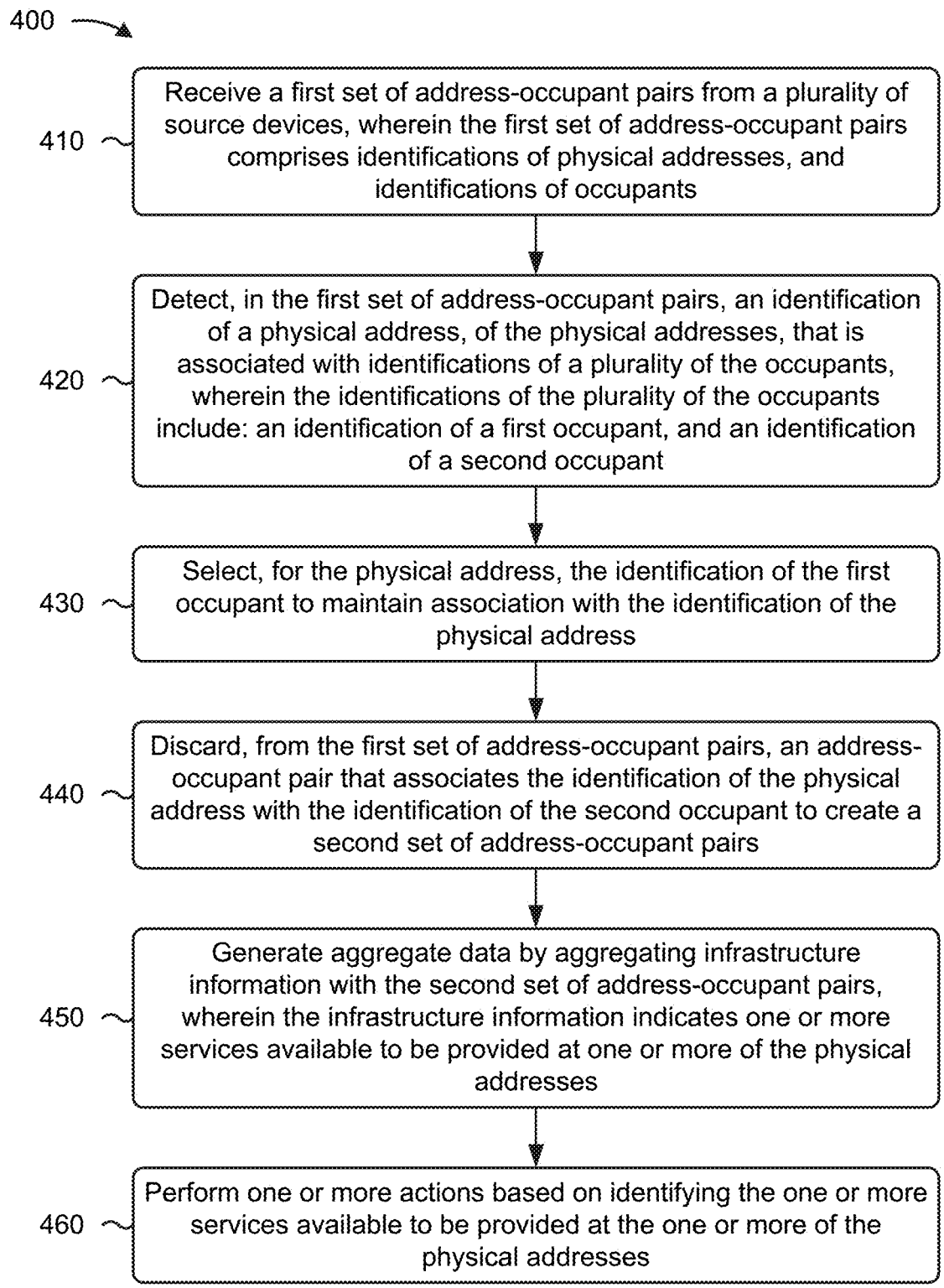
FIG. 4 is a flow chart of an example process for identifying available services at a physical address.

FIG. 4 is a flow chart of an example process 400 for systems and methods for identifying available services at a physical address. In some implementations, one or more process blocks of FIG. 4 may be performed by a service notification platform (e.g., service notification platform 260). In some implementations, one or more process blocks of FIG. 4 may be performed by another device or a group of devices separate from or including the service notification platform, such as a service provider device (e.g., service provider device 210), a search engine device (e.g., search engine device 220), a source device (e.g., source device 230), a user management device (e.g., user management device 240), a user device (e.g., user device 250), and/or a computing resource (e.g., computing resource 265), and/or the like.

As shown in FIG. 4, process 400 may include receiving a first set of address-occupant pairs from a plurality of source devices (block 410). For example, the service notification platform (e.g., using computing resource 265, processor 320, memory 330, storage component 340, input component 350, output component 360, communication interface 370 and/or the like) may receive a first set of address-occupant pairs from a plurality of source devices, as described above. In some aspects, the first set of address-occupant pairs comprises identifications of physical addresses, and identifications of occupants.

In some implementations, process 400 includes translating the identifications of the physical addresses into standardized identifications of the physical addresses. In some implementations, process 400 may include assigning, to the identifications of the physical addresses, address keys and sub-address keys. An address key may be associated with a building address and a sub-address key may be associated with a unit within the building address. In some embodiments, a sub-address key may be associated with a three-dimensional area, region, etc. For example, in situations where a sub-address key is associated with a unit within a multi-story apartment building, two different sub-address keys, or two different sets of sub-address keys, may be associated with the same (or substantially the same) two-dimensional area or region, but may be associated with different heights, altitudes, etc. Such different sub-address keys may be associated with, for example, two apartment units, where one unit is above the other. The determination and/or generation of sub-address keys, in accordance with some embodiments, is discussed below.

As further shown in FIG. 4, process 400 may include detecting, in the first set of address-occupant pairs, an identification of a physical address that is associated with identifications of a plurality of the occupants (block 420). For example, the service notification platform (e.g., using computing resource 265, processor 320, memory 330, storage component 340, input component 350, output component 360, communication interface 370 and/or the like) may detect, in the first set of address-occupant pairs, an identification of a physical address and/or sub-address, of the physical addresses, that is associated with identifications of a plurality of the occupants, as described above. In some aspects, the identifications of the plurality of the occupants include an identification of a first occupant, and an identification of a second occupant.

As further shown in FIG. 4, process 400 may include selecting, for the physical address, the identification of the first occupant to maintain association with the identification of the physical address (block 430). For example, the service notification platform (e.g., using computing resource 265, processor 320, memory 330, storage component 340, input component 350, output component 360, communication interface 370 and/or the like) may select, for the physical address, the identification of the first occupant to maintain association with the identification of the physical address, as described above. In some implementations, the selection of the identification of the first occupant is based on sub-address keys (e.g., which may be based on three-dimensional regions and/or areas).

In some implementations, selecting the identification of the first occupant comprises selecting the identification of the first occupant based on a quantity of the identifications of the plurality of the occupants that identify the first occupant. Process 400 may include determining the quantity of the identifications of the plurality of the occupants that identify the first occupant using a fuzzy logic process.

In some implementations, selecting the identification of the first occupant comprises performing one or more Internet searches based on at least one of the physical address, the identification of the first occupant, or the identification of the second occupant. Selecting the identification of the first occupant may further comprise selecting the second set of address-occupant pairs based on search results of the one or more Internet searches.

In some implementations, process 400 may include assigning values to the identifications of the plurality of the occupants based on respective source devices, of the plurality of source devices, from which the service notification platform received the identifications of the plurality of occupants within the first set of address-occupant pairs. Selecting the identification of the first occupant may then comprise selecting the identification of the first occupant based on total values of the identifications of the plurality of the occupants. In some implementations, assigning the values to the identifications of the plurality of the occupants comprises determining the values using a model trained using one or more machine learning processes.

As further shown in FIG. 4, process 400 may include discarding, from the first set of address-occupant pairs, an address-occupant pair that associates the identification of the physical address with the identification of the second occupant to create a second set of address-occupant pairs (block 440). For example, the service notification platform (e.g., using computing resource 265, processor 320, memory 330, storage component 340, input component 350, output component 360, communication interface 370 and/or the like) may discard, from the first set of address-occupant pairs, an address-occupant pair that associates the identification of the physical address with the identification of the second occupant to create a second set of address-occupant pairs, as described above.

As further shown in FIG. 4, process 400 may include generating aggregate data by aggregating infrastructure information with the second set of address-occupant pairs (block 450). For example, the service notification platform (e.g., using computing resource 265, processor 320, memory 330, storage component 340, input component 350, output component 360, communication interface 370 and/or the like) may generate aggregate data by aggregating infrastructure information with the second set of address-occupant pairs, as described above. In some implementations, the infrastructure information indicates one or more services available to be provided at one or more of the physical addresses. In some implementations, generation of the aggregate data is based on address keys.

As further shown in FIG. 4, process 400 may include performing one or more actions based on identifying the one or more services available to be provided at the one or more of the physical addresses (block 460). For example, the service notification platform (e.g., using computing resource 265, processor 320, memory 330, storage component 340, input component 350, output component 360, communication interface 370 and/or the like) may perform one or more actions based on identifying the one or more services available to be provided at the one or more of the physical addresses, as described above.

Process 400 may include additional implementations, such as any single implementation or any combination of implementations described below and/or in connection with one or more other processes described elsewhere herein.

Performing the one or more actions may comprise providing, to a user device, a notification related to a service currently used or available for use at an address. Additionally, or alternatively, performing the one or more actions may comprise providing, to a user device associated with a service provider, a recommendation for deployment of additional infrastructure.

In some implementations, process 400 may include receiving, from a user management device, identifications of users, and determining one or more associations between at least one occupant of one or more of the occupants, for which the one or more services are available to be provided, and one or more of the users. Process 400 may further include providing to a user device, when performing the one or more actions, a notification related to a service to at least one occupant based on the one or more associations between the at least one occupant and the one or more of the users. Additionally, or alternatively, processes 400 may include providing to a user device associated with a service provider, when performing the one or more actions, a recommendation to deploy additional infrastructure to one or more physical addresses associated with at least one occupant, for which the one or more services are not available to be provided, based on the one or more associations between the at least one occupant and the one or more of the users.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
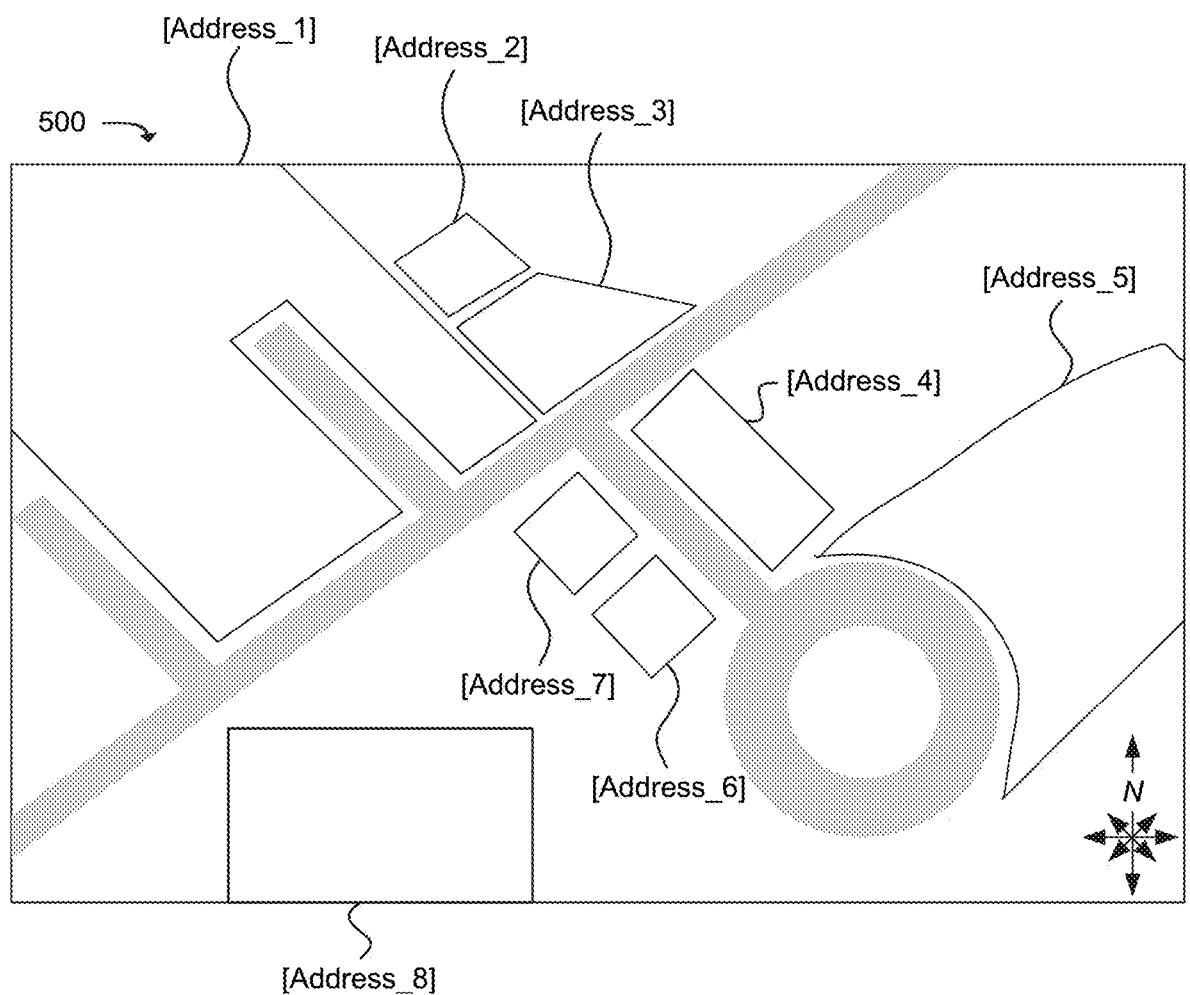
FIG. 5 is a diagram of an overhead view of addresses used to denote locations on a map.

As noted above, some embodiments may make use of sub-address keys to denote locations of particular assets, such as infrastructure assets (e.g., radio towers, data centers, buried fiber or other cable, or the like), customer premises assets (e.g., workplaces, residences, or other locations associated with consumers or users of the infrastructure assets), and/or other types of assets. Sub-address keys may provide a greater level of granularity than simple addresses (e.g., postal addresses), as addresses may vary widely in different situations. For example, as shown in FIG. 5, overhead map 500 may depict eight example addresses. The example addresses are denoted as "[Address_1]" through "[Address_8]," where such notation represents physical and/or postal addresses such as "123 Main St., Arlington, Va." or "321 South State St., Fairfax, Va."

As shown in the figure, the geographical areas associated with respective addresses may vary in shape and/or size (e.g., as measured in two dimensions and represented in longitude and latitude or some other suitable two-dimensional notation). Further, while not readily shown in this figure, different addresses may include buildings or structures with varying quantities of floors or other measures of height. For example, a building located at [Address_7] may be a two-story house, while a building located at [Address_8] may be a seven-story apartment building. Thus, when determining whether to install, provide, etc. infrastructure, making such a determination based on addresses may not provide a level of granularity suitable to provide accurate information to make such a determination. Further, for example, when a given infrastructure item (e.g., a radio tower, data center, etc.) is to be repaired, providing an address to a repair technician may result in confusion or ambiguity as to the exact location of the infrastructure item. Additionally, some locations may not be associated with an address, such as infrastructure items deployed on a side of a road, within a field or forest, etc.

Figure 6:
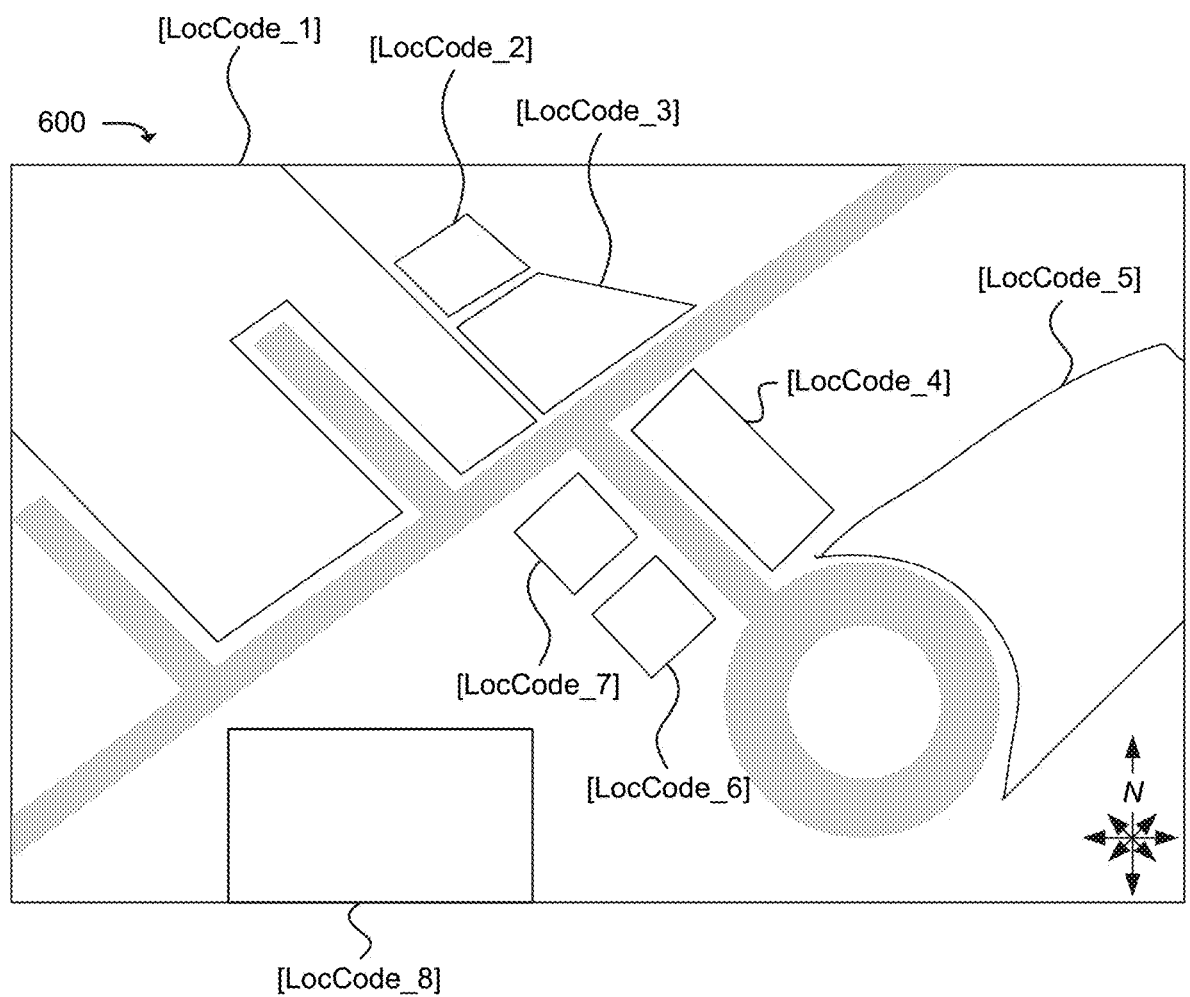
FIG. 6 is a diagram of an overhead view of location codes used to denote locations on a map.

As shown in FIG. 6, some systems may use, generate, etc. location codes that correspond to street addresses. For example, a particular location code may be based on a cryptographic hash or other function performed on a street address, may be based on a set of latitude and longitude coordinates associated with a street address, or the like. For example, as depicted in overhead map 600 of FIG. 6, the addresses of FIG. 5 (e.g., [Address_1] through [Address_8]) may each be associated with a particular location code, denoted in FIG. 6 as "[LocCode_1]" through "[LocCode_8]." However, in implementations where addresses and location codes share a one-to-one relationship (e.g., according to the example shown in FIGS. 5 and 6), indicating the location of infrastructure elements and/or other assets using location codes may share the same shortcomings as using physical addresses.

Figure 7:
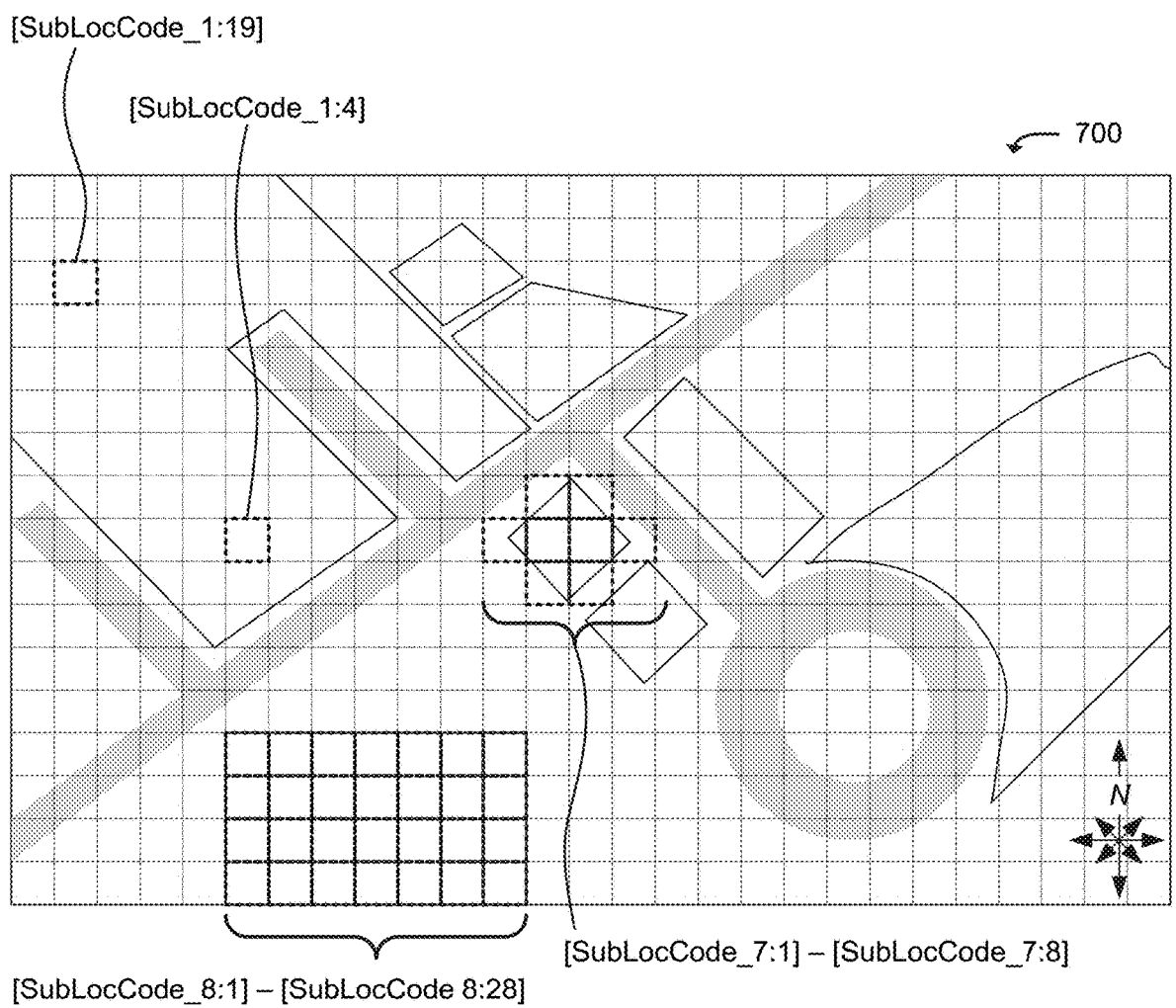
FIG. 7 is a diagram of an overhead view of sub-location codes used to denote locations on a map.

Some implementations may make use of more granular two-dimensional identifiers. For example, as shown in FIG. 7, overhead map 700 may include the use of sub-address keys, such as sub-location codes, to indicate more precise or granular areas than indicated by street addresses (e.g., as shown in FIG. 5) or location codes (e.g., as shown in FIG. 6). For example, as shown in FIG. 6, service notification platform 260 may generate or determine a set of sub-location codes for the addresses or location codes shown in FIGS. 5 and 6, respectively. In some embodiments, sub-location codes may be based on a grid or other type of arrangement or delineation of geographical areas. In one example embodiment, sub-location codes may be based on a static and/or pre-defined grid, in which sets of latitude and longitude coordinates are specified at set intervals to define bounds of sections of the grid. In this manner, relatively large areas (e.g., cities, states, provinces, countries, etc.) may be sub-divided into a set of sub-location codes, where each sub-location code corresponds to a particular section of the grid.

As shown in FIG. 7, for example, the area corresponding to the example address [Address_8] (e.g., as denoted in FIG. 5) and/or the example location code [LocCode_8] (e.g., as denoted in FIG. 6) may be sub-divided into 28 sub-address keys (e.g., 28 sub-location codes, shown as sub-location codes [SubLocCode_8:1] through [SubLocCode_8:28]). In this example, this area (i.e., corresponding to [Address_8] and/or [LocCode_8]) may include a 7×4 grid corresponding to the sub-location codes, based on which service notification platform 260 may identify the 28 sub-location codes.

For the sake of clarity, FIG. 7 only shows some sub-location codes (e.g., sub-location codes corresponding to portions of street addresses and/or location codes discussed above with respect to FIGS. 5 and 6). In practice, the entire map 700 may be divided into a grid, with each section of the grid corresponding to a particular distinct sub-location code.

In some embodiments, sub-location codes may be a function of a location code corresponding to the same area. For instance, while the notation [LocCode_8] is used herein to refer to a location code, in practice, this location code may be indicated in some other manner, such as a string (e.g., ABCD+EF). In one embodiment, a location code may be received from an external system that generates and/or otherwise provides location codes, such as the open source Plus Codes system. In some embodiments, service notification platform 260 may receive such information via an application programming interface ("API") or some other suitable technique. In some embodiments, service notification platform 260 may generate or derive a location code based on information received from such an external system. For example, service notification platform 260 may receive a set of sub-location codes corresponding to a portion of the location denoted by the location code [LocCode_8]. Assume, for example, that the received sub-location codes have no information pertaining to the address or location code. For example, a particular sub-location code at the edge of the street address may follow a similar pattern or algorithm as an adjacent sub-location code that is external to the street address.

In some embodiments, service notification platform 260 may modify such received external or third party sub-location codes further based on a street address and/or location code to which the sub-location codes pertain. For example, assume that service notification platform 260 receives a sub-location code that corresponds to a portion of the location associated with the location code [LocCode_8]. Service notification platform 260 may modify this received sub-location code to include some or all of the location code [LocCode_8], and/or may otherwise modify the received sub-location code based on the location code [LocCode_8] (e.g., may perform a hash function or some other suitable function for which the particular sub-location code and the location code [LocCode_8] are inputs). Additionally, or alternatively, service notification platform 260 may modify received sub-location codes based on a corresponding street address (e.g., may perform a hash function or some other suitable function for which the particular sub-location code and the corresponding street address [Address_8] are inputs). In this manner, the sub-location codes generated or determined by service notification platform 260 may be further tied to street addresses and/or location codes, such that street addresses and/or location codes may be able to be ascertained (e.g., by way of lookup or "reverse" lookup) from sub-location codes of embodiments described herein.

Thus, the example notation "[SubLocCode_8:1]" refers to a first sub-location (i.e., as denoted by the "1" following the colon) of a location referred to by the location code [LocCode_8]. Similarly, the example notation "[SubLocCode_1:19]" refers to a 19th sub-location (i.e., as denoted by the "19" following the colon) of a location referred to by the location code [LocCode_1]. In some embodiments, in situations where the sub-location codes generated or determined by service notification platform 260 are different from sub-location codes received from another device or system (e.g., Plus Codes), service notification platform 260 may maintain a copy of the sub-location codes generated by service notification platform 260, in addition to sub-location codes received from the other device or system. In some embodiments, service notification platform 260 may maintain only the sub-location codes generated or determined by service notification platform 260 in lieu of maintaining the sub-location codes as received from the other device or system.

Sub-location codes, as referred to herein, may provide relatively precise indications of locations in a two-dimensional region. For example, as shown in FIGS. 5-7, the location associated with the address [Address_1] or the location code [LocCode_1] may be relatively large. Thus, providing the address to a technician, network planning system, and/or other entity may not provide precise indications as to a particular point of interest. In contrast, providing sub-location codes (e.g., [SubLocCode_1:4] or [SubLocCode_1:19], as shown in FIG. 7) may provide a more precise indication of the particular point of interest.

Figure 8:
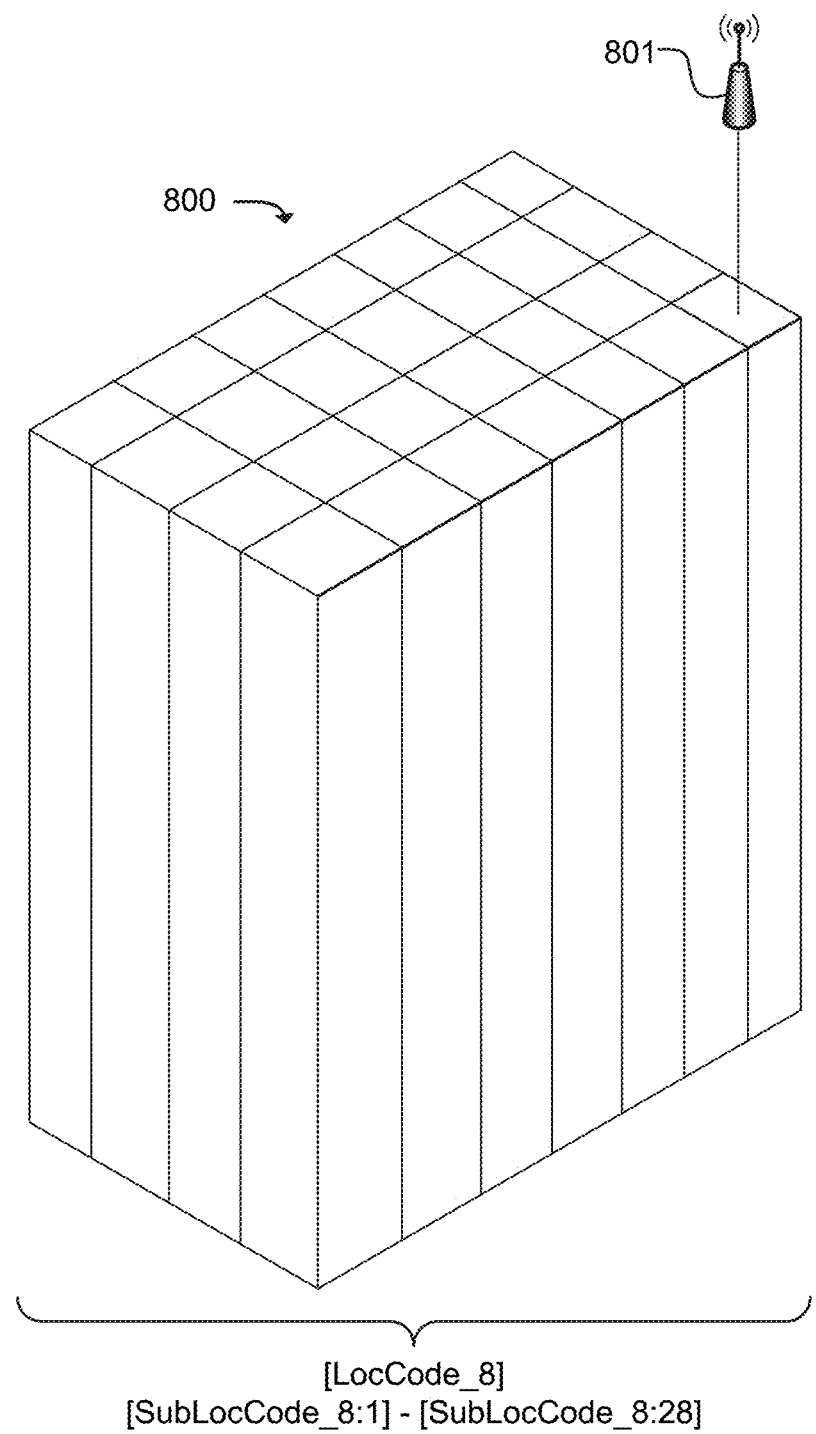
FIG. 8 is a diagram depicting an oblique view of a building that may be associated with a location code and/or a set of sub-location codes.

However, in some situations, a precise indication of location in two-dimensional space may not suffice. For example, as shown in FIG. 8, multi-story building 800 may be associated with the location associated with the address [Address_8] and/or the location code [LocCode_8]. That is, the sub-location codes [SubLocCode_8:1] through [SubLocCode_8:28] may refer to this multi-story building. However, as illustrated in this figure, a given sub-location code may refer to multiple stories of the building. Further, a given sub-location code may also refer to an infrastructure element mounted to the exterior of building 800, such as tower 801. Thus, when a sub-location code is provided for building 800, it may be ambiguous as to a particular unit or story of building 800 to which the sub-location code refers, and it further may be ambiguous as to whether the sub-location code refers to the exterior (e.g., roof) of building 800 or an area above the exterior of building 800 (e.g., tower 801).

Figure 9:
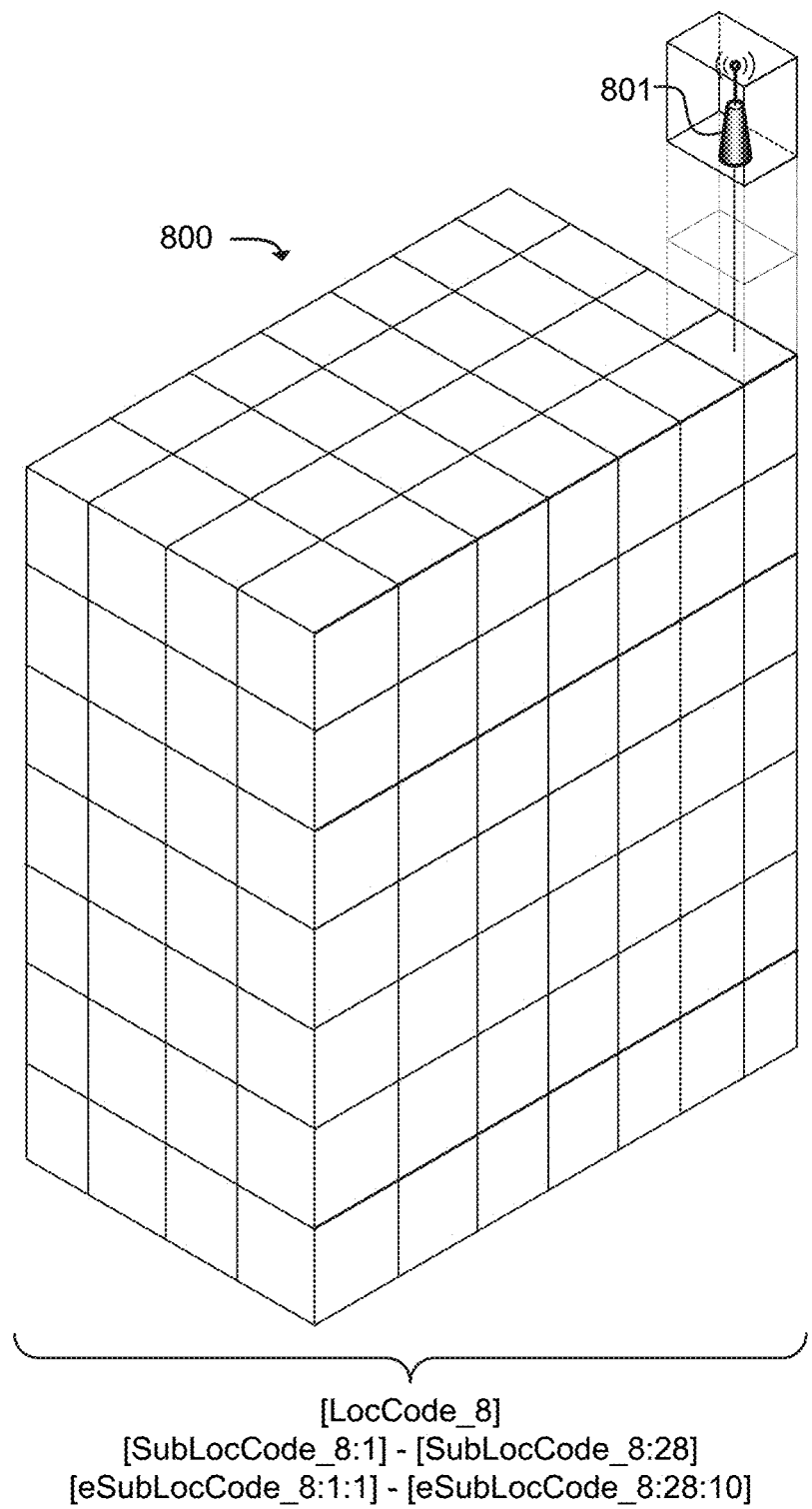
FIG. 9 is a diagram depicting an oblique view of a building that may be associated with a location code, a set of sub-location codes, and/or a set of enhanced sub-location codes.
Figure 10:
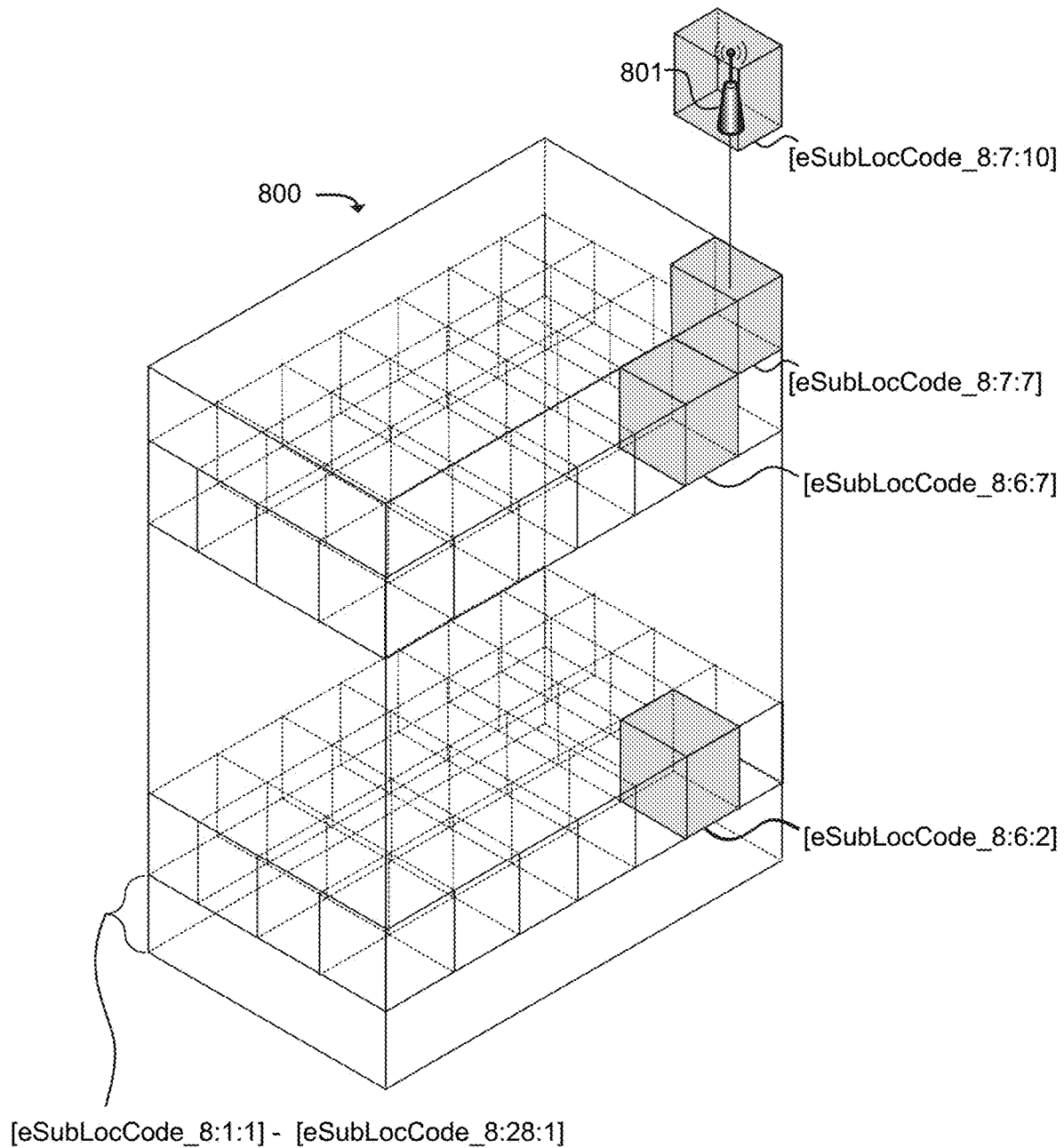
FIG. 10 is a diagram depicting particular example enhanced sub-location codes in an oblique view of a building.

In accordance with some embodiments, and as shown in FIGS. 9 and 10, service notification platform 260 may generate enhanced sub-location codes, which may further introduce a third dimension to the location information indicated by sub-location codes. For example, as shown, building 800, which is associated with location code [LocCode_8] and sub-location codes [SubLocCode_8:1] through [SubLocCode_8:28], may further be associated with enhanced sub-location codes [eSubLocCode_8:1:1] through [eSubLocCode_8:28:10]. For example, the notation "[eSubLocCode_8:28:10]" may refer to a three-dimensional area on the tenth story (denoted by the "10" after the second colon) of the 28th sub-location (denoted by the "28" after the first colon) in the 7×4 grid associated with location code [LocCode_8]. In some embodiments, the height component of the enhanced sub-location codes (e.g., the "10" in the example enhanced sub-location code [eSubLocCode_8:28:10]) may be correlated to stories of building 800. Additionally, or alternatively, the enhanced sub-location codes may be independent of stories of building 800 (e.g., may denote a static or pre-defined height, altitude, or ranges of heights and/or altitudes).

As shown in FIG. 10, for example, the range of enhanced sub-location codes [eSubLocCode_8:1:1] through [eSubLocCode_8:28:1] may be associated with a first story or height range of building 800. Individual enhanced sub-locations are also depicted in FIG. 10 by the shaded three-dimensional polygons. For example, example enhanced sub-locations [eSubLocCode_8:6:2] and [eSubLocCode_8:6:7] may both be associated with different stories of building 800 that are located at the same two-dimensional sub-location [SubLocCode_8:6]. Similarly, enhanced sub-location code [eSubLocCode_8:7:7] may refer to a top floor of building 800, while enhanced sub-location code [eSubLocCode_8:7:10] may refer to the location of tower 801, which is located above the roof of building 800.

In some embodiments, service notification platform 260 may generate or determine enhanced sub-location codes based on sub-location codes, as well as a height component associated with a given enhanced sub-location. For example, service notification platform 260 may generate or receive a set of sub-location codes, and may generate enhanced sub-location codes by performing a hashing function or other suitable function (e.g., an appending function, a prepending function, or the like) using sub-location codes and a height component as inputs to the function. In some embodiments, as discussed below, a sub-location code, location code, street address, or other identifier may be able to be derived from or may otherwise correspond to an enhanced sub-location code.

Figure 11:
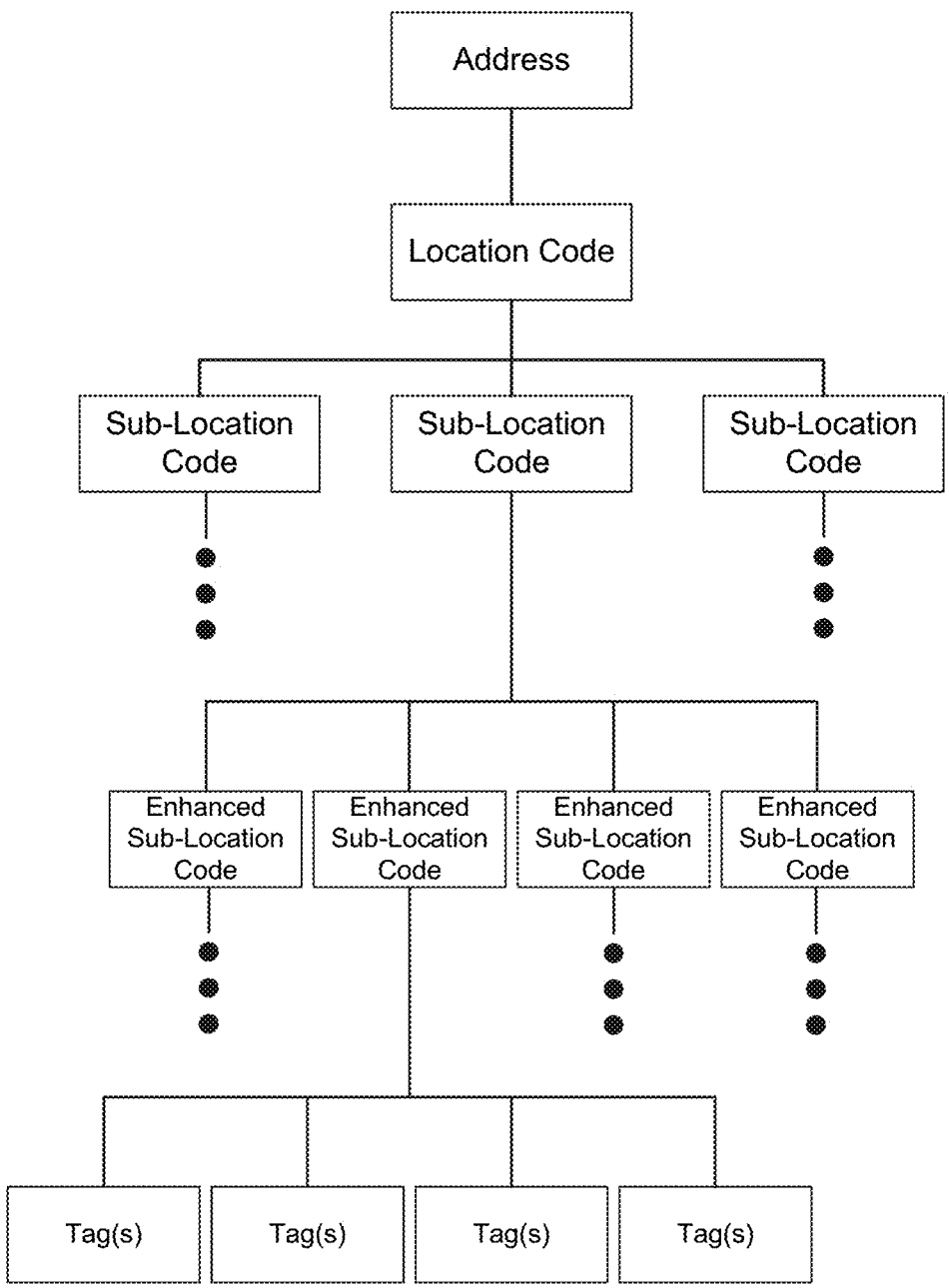
FIG. 11 is a diagram of an example data structure that associates an address with a location code, a set of sub-location codes, a set of enhanced-sublocation codes, and/or one or more tags.

For example, as shown in FIG. 11, example data structure 1100 may be generated, received, and/or otherwise maintained by service notification platform 260, to correlate enhanced sub-location codes, sub-location codes, location codes, and/or street addresses. For example, as shown, data structure 1100 may associate a particular street address with a particular location code. In some embodiments, street addresses and location codes may share a one-to-one relationship. Location codes may be used to, for example, obscure street addresses for security purposes (e.g., an individual may not want to share his or her street address). In some embodiments, location codes may include, may be based on, may be derived from, and/or may be associated with, latitude and longitude coordinates. For example, a particular location code may be a hash or other function performed on latitude and longitude coordinates that define a two-dimensional polygon or other boundary that define a street address.

As further shown, the location code and/or the street address may be associated with a set of sub-location codes. As noted above, a particular sub-location code may define a two-dimensional area or region that falls entirely or partially within an area or region associated with a particular street address or location code. Thus, multiple sub-location codes may be associated with the same location code or street address.

As further shown, each sub-location code may be associated with a group of enhanced sub-location codes. As noted above, a set of enhanced sub-location codes may be associated with a particular sub-location code. For example, the set of enhanced sub-location codes associated with a particular sub-location code may include the particular sub-location code (e.g., may include a height component appended to, prepended to, or inserted into the particular sub-location code), may be derived from the particular sub-location code (e.g., a height component and the sub-location code may be inputs into a function based on which the enhanced sub-location codes are derived), and/or enhanced sub-location codes may otherwise be associated with sub-location codes. In some embodiments, on the other hand, the values of enhanced sub-location codes may be independent from values of their respective sub-location codes. In such embodiments, a location code, address, etc. may not readily be able to be derived from an enhanced sub-location code.

In some embodiments, enhanced location codes may be associated with one or more tags. Tags may include, for example, narrative descriptors of a location or directions on how to arrive at a location denoted by an enhanced sub-location code, such as "Roof of the building," "Southeast corner of fourth floor of building," "Apartment unit 696," or some other tag, identifier, etc. In some embodiments, tags may be received from operators, technicians, etc. who provide the tags via an API, a web portal, or some other interface. In some embodiments, service notification platform 260 may automatically generate tags using machine learning or other suitable automated techniques. For example, service notification platform 260 may determine or receive information indicating that a particular street address includes a high-rise building with eight stories. For each enhanced sub-location code, service notification platform 260 may determine a story of the building based on, for example, a height of the building and/or a height associated with the particular enhanced sub-location code. As another example, service notification platform 260 may analyze images (e.g., geotagged images) associated with a given street address, location code, sub-location code, enhanced sub-location code, etc., based on which the one or more tags may be generated. For example, service notification platform 260 may receive a geotagged image that depicts tower 801 situated above the roof of building 800, and may generate a tag for enhanced sub-location [eSubLocCode_8: 7:10] (e.g., the enhanced sub-location at which tower 801 is located) such as "tower mounted to roof" using image recognition techniques, artificial intelligence techniques, machine learning techniques, and/or other suitable techniques.

In some embodiments, service notification platform 260 may respond to queries or may otherwise determine or provide information based on the individual elements of data structure 1100 and/or their relationships with each other. For example, service notification platform 260 may receive a request for enhanced sub-location codes associated with a particular street address. Service notification platform 260 may identify some or all of the enhanced sub-location codes associated with the particular street address, and may return the codes in response to the query. As another example, service notification platform 260 may receive a request for enhanced sub-location codes associated with a particular sub-location code. Service notification platform 260 may identify some or all of the enhanced sub-location codes associated with the particular sub-location code, and may return the enhanced sub-location codes in response to the query. In some embodiments, when returning the enhanced sub-location codes, service notification platform 260 may provide some or all of the tags associated with each sub-location code.

Figure 12:
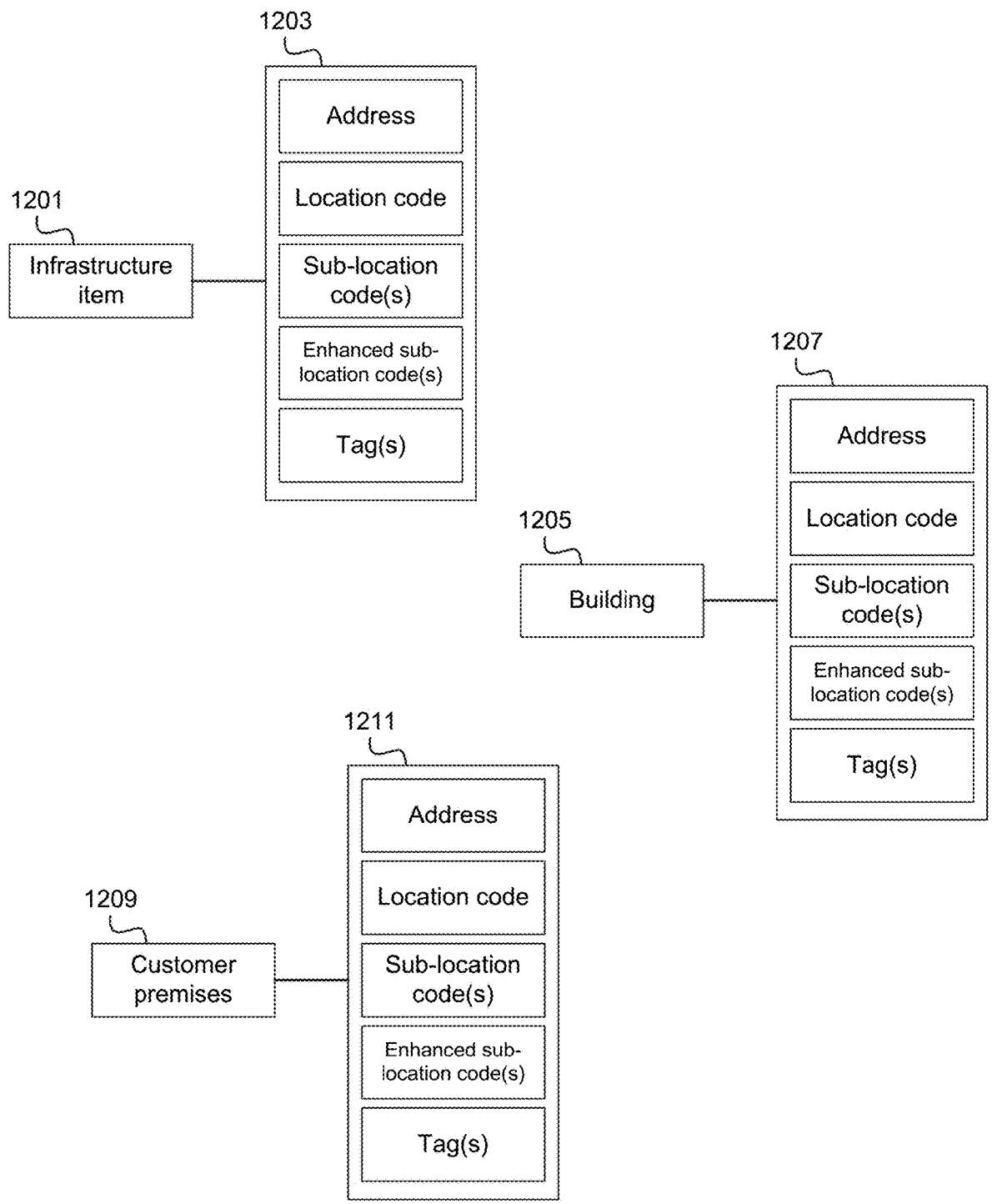
FIG. 12 is a diagram of example assets that may be associated with an address, a location code, a set of sub-location codes, a set of enhanced-sublocation codes, and/or one or more tags.

In some embodiments, service notification platform 260 may associate particular addresses, location codes, sub-location codes, and/or enhanced sub-location codes with particular assets. For example, as shown in FIG. 12, a first asset 1201 may be associated with first address key/sub-address key information 1203, a second asset 1205 may be associated with second address key/sub-address key information 1207, and a third asset 1209 may be associated with second address key/sub-address key information 1211. For example, as mentioned above, an address key for asset 1201, as indicated by information 1203, may include a street address and/or location code associated with asset 1201. Further, one or more sub-address keys for asset 1201, as indicated by information 1203, may include one or more sub-location codes and/or enhanced sub-location codes. Information 1203 may further include one or more tags associated with the address, location code, sub-location codes, and/or enhanced sub-location codes.

In some embodiments, service notification platform 260 may receive queries for particular assets, may generate recommendations regarding assets (e.g., coverage areas associated with wireless radios as they pertain to premises of customers of wireless service or of potential customers), may perform machine learning to form or identify relationships between assets (e.g., may identify that a particular asset 1201 (e.g., an infrastructure item, such as a radio tower), is located in or on an asset 1205 (e.g., a building) in which another asset 1209 (e.g., a particular customer premises) is located), and/or may perform other suitable functions based on the example information 1203, 1207, and 1211 shown in FIG. 12.

For example, in some embodiments, service notification platform 260 may determine an address-occupant pair based on such information (e.g., where the "address" in the address-occupant pair includes or is associated with a particular enhanced sub-location code). As another example, service notification platform 260 may generate (e.g., at block 450) aggregate data based on infrastructure information associated with particular an enhanced sub-location code, or a set of enhanced sub-location codes. For example, service notification platform 260 may use such enhanced sub-location codes to determine or identify services available on particular stories of buildings and/or other structures or regions where height may be a differentiating factor.

In some embodiments, for instance, a repair technician may be able to use such information to quickly locate a particular infrastructure item that may otherwise be difficult to locate, such as an infrastructure item that is located in or on a multi-story building, in a precise location of a relatively large structure or lot (e.g., a mall, a cornfield, etc.), and/or is otherwise not readily identifiable based on a street address alone. For example, the infrastructure item may include a physical antenna or radio tower associated with a RAN of a wireless network, which is malfunctioning or is otherwise in need of maintenance or upgrades.

A repair technician may provide an identifier of a particular infrastructure item (e.g., where different infrastructure items have different unique identifiers by which they may be differentiated from each other) via a web portal, API, or the like associated with service notification platform 260. Additionally, or alternatively, service notification platform 260 may receive an indication of the particular infrastructure item from a system that automatically identifies infrastructure items that have been assigned to technicians, and/or that otherwise provide indications to service notification platform 260 of infrastructure items that are in need of repair or maintenance. Additionally, or alternatively, service notification platform 260 may receive an indication of a street address, location code, sub-location code, and/or enhanced sub-location code, and may identify one or more infrastructure items associated with the street address, location code, etc.

Service notification platform 260 may, in response, provide some or all of the information associated with the precise location of the infrastructure item. For example, assuming the infrastructure item of this example is associated with asset 1201, service notification platform 260 may provide some or all of information 1203 in response to an indication (e.g., query or other indication) of asset 1201 (e.g., as received from a repair technician, an automated system, etc.). For example, service notification platform 260 may provide, to a UE (such as a mobile phone, a tablet, or the like) associated with the repair technician, a sub-location code associated with asset 1201 (e.g., the requested infrastructure item), an enhanced sub-location code, and/or one or more tags associated with asset 1201. As noted above, the tags may include detailed information describing asset 1201, describing directions for arriving at asset 1201, information describing landmarks or other attributes of a location in which asset 1201 is located, and/or other suitable information).

The UE may accordingly display some or all of the received information, in order to assist the repair technician in locating asset 1201 (e.g., the requested infrastructure item). For example, the UE may present the enhanced sub-location codes and/or the tags. In some embodiments, the UE may present the enhanced sub-location codes by identifying one or more corresponding three-dimensional regions on a map (e.g., a three-dimensional topographical map, a three-dimensional building map, or the like), and indicating the three-dimensional regions that correspond to the enhanced sub-location codes via the three-dimensional map. For example, the three-dimensional map may be interactive, such that the technician (or other user) may manipulate the map (e.g., rotate, zoom, etc.) to clearly identify where on the map (e.g., where in three-dimensional space) the requested infrastructure item is located. Additionally, the repair technician may further use the tags to visually identify the requested infrastructure item and/or landmarks indicated by the tags.

In some embodiments, information 1203 may be used by the UE of the requesting technician (or other user) to provide navigation instructions. For example, the UE (and/or some other device or system) may use the address, location code, sub-location code, and/or enhanced sub-location codes to generate directions from a current location of the UE to the requested infrastructure item. In this manner, driving and/or walking directions, to the precise location of the requested infrastructure item, may be provided to the technician, thereby eliminating guesswork or undue burden in locating the infrastructure item.

Figure 13:
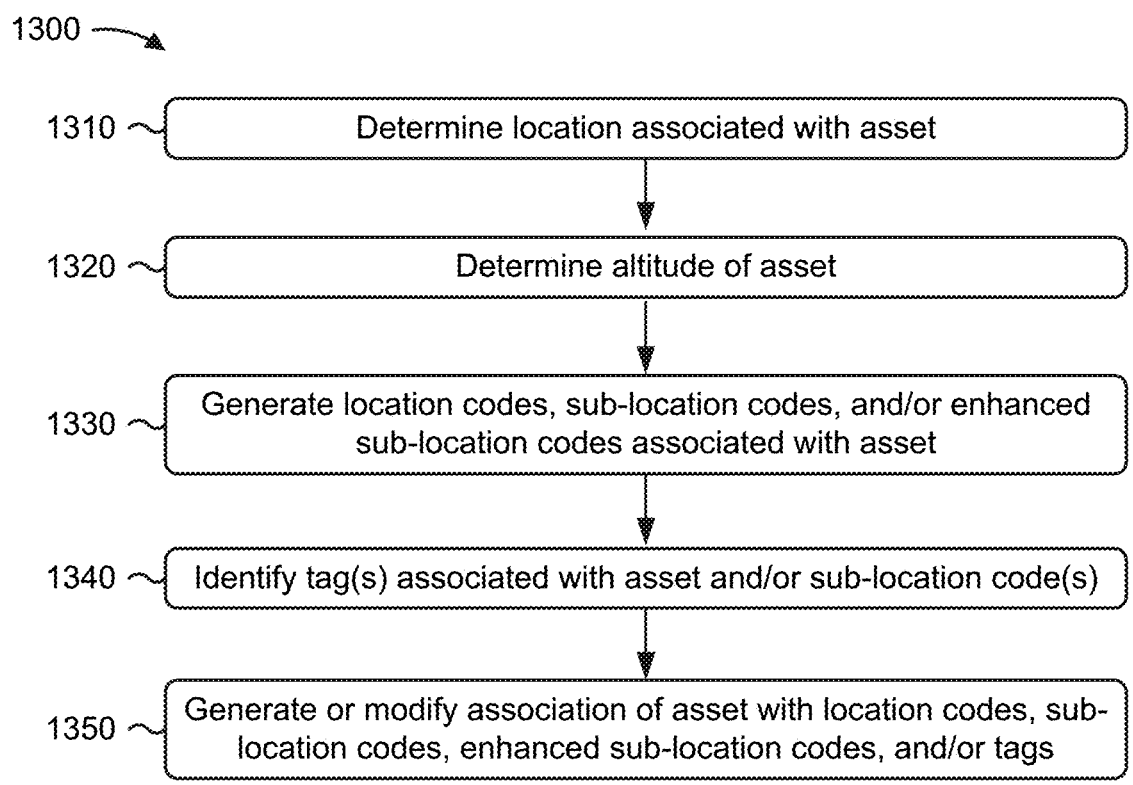
FIG. 13 is a flow chart of an example process for generating and/or modifying an association of an asset with an address, a location code, a set of sub-location codes, a set of enhanced-sublocation codes, and/or one or more tags.

FIG. 13 is a flow chart of an example process 1300 for systems and methods for generating and/or modifying an association of an asset with an address, a location code, a set of sub-location codes, a set of enhanced-sublocation codes, and/or one or more tags. In some implementations, one or more process blocks of FIG. 4 may be performed by another device or a group of devices separate from or including the service notification platform, such as a service provider device (e.g., service provider device 210), a search engine device (e.g., search engine device 220), a source device (e.g., source device 230), a user management device (e.g., user management device 240), a user device (e.g., user device 250), and/or a computing resource (e.g., computing resource 265), and/or the like.

As shown in FIG. 13, process 1300 may include determining a location associated with an asset (block 1310). For example, service notification platform 260 (e.g., using computing resource 265, processor 320, memory 330, storage component 340, input component 350, output component 360, communication interface 370 and/or the like) may receive information indicating a location of a particular asset. The information may be generated using automated techniques, such as using a Global Positioning System GPS technique, a wireless triangulation technique, and/or some other suitable type of automated location determination technique. For example, in some embodiments, the asset may include location determination hardware and/or logic, which may provide the location information to service notification platform 260 (e.g., via an API, web portal, or the like). Additionally, or alternatively, in some embodiments, the location information for the asset may provided by a technician, an operator, or the like. In some embodiments, the location (received at block 1310) may be a relatively precise location, such as having a margin of error of one meter, three meters, or some other relatively low margin of error (e.g., may be more granular than a physical address). In some embodiments, the location information may be presented as one or more sets of latitude and longitude coordinates and/or some other suitable indicator of precise location (e.g., two-dimensional location information).

In some embodiments, service notification platform 260 may receive geotagged image information of one or more assets, based on which service notification platform 260 may perform image recognition, machine learning, and/or other suitable techniques to determine a location of a given asset. For example, service notification platform 260 may receive a geotagged image depicting tower 801, and may determine based on a location of the geotagged image, one or more angles depicted in the image, and/or other characteristics of the image, the precise location of tower 801.

As further shown in FIG. 13, process 1300 may include determining an altitude of the asset (block 1320). For example, service notification platform 260 (e.g., using computing resource 265, processor 320, memory 330, storage component 340, input component 350, output component 360, communication interface 370 and/or the like) may determine the altitude, height, or other measure of vertical (e.g., relative to sea level, ground level, or other suitable reference point) positioning of the asset. The height information may be generated using automated techniques, such as using readings from an altimeter, a barometer, and/or some other suitable type of sensor or automated height determination technique. For example, in some embodiments, the asset may include height determination hardware and/or logic, which may provide the height information to service notification platform 260 (e.g., via an API, web portal, or the like). Additionally, or alternatively, in some embodiments, the height information for the asset may provided by a technician, an operator, or the like.

In some embodiments, service notification platform 260 may receive geotagged image information of one or more assets, based on which service notification platform 260 may perform image recognition, machine learning, and/or other suitable techniques to determine a height, altitude, etc. of a given asset. For example, service notification platform 260 may receive a geotagged image depicting tower 801, and may determine based on a location of the geotagged image, one or more angles depicted in the image, and/or other characteristics of the image, a height and/or precise vertical positioning of tower 801.

As further shown in FIG. 13, process 1300 may include generating location codes, sub-location codes, and/or enhanced sub-location codes associated with the asset (block 1330). For example, service notification platform 260 (e.g., using computing resource 265, processor 320, memory 330, storage component 340, input component 350, output component 360, communication interface 370 and/or the like) may generate the location codes and/or sub-location codes by providing location information associated with the asset (e.g., as determined at block 1310) as input to a function that generates location codes and/or sub-location codes. The function may include, for example, a hashing function or other suitable function that provides the location codes and/or sub-location codes in response to providing the location information. As noted above, the location information for the asset may be relatively precise location information. Thus, the generated location code may be less precise than the location information (e.g., may be associated with a particular street address), while the sub-location information may be closer to the level of precision of the location information than the location code (e.g., may indicate a particular quadrant or other sub-section of the street address).

In some embodiments, service notification platform 260 may generate one or more enhanced sub-location codes associated with the asset based on the height or altitude information (e.g., as received at block 1320). For example, in some embodiments, service notification platform 260 may generate the one or more enhanced sub-location codes for the asset based on the determined height, as well as the one or more sub-location codes associated with the asset. For example, service notification platform 260 may provide a height and a sub-location code as input to a function, such as a hashing function or other suitable function, that generates the enhanced sub-location code. In this manner, the generated enhanced sub-location code may be based on the sub-location code in such a way that the sub-location code can be readily ascertained from the enhanced sub-location code. For example, a height component (e.g., indicating the height or altitude of the asset) may be appended to the sub-location code, may be prepended to the sub-location code, and/or may otherwise be combined with the sub-location code to yield the enhanced sub-location code. In some embodiments, a static function may be used to generate the enhanced sub-location code from the height and the sub-location code, such that an inverse of the static function may be used to ascertain the height and the sub-location code from the enhanced sub-location code.

In some embodiments, service notification platform 260 may generate the one or more enhanced sub-location codes in a manner that is independent of the sub-location code. For example, service notification platform 260 may generate the enhanced sub-location codes using a random function, and/or a cryptographic hashing function with a private (e.g., non-shared) key. In some embodiments, service notification platform 260 may generate the enhanced sub-location codes based on the location information (received at block 1310), without including a corresponding sub-location code.

As further shown in FIG. 13, process 1300 may include identifying one or more tags associated with the asset and/or the sub-location codes (block 1340). For example, service notification platform 260 (e.g., using computing resource 265, processor 320, memory 330, storage component 340, input component 350, output component 360, communication interface 370 and/or the like) may use machine learning, artificial intelligence, and/or one or more other techniques to generate one or more tags associated with the asset and/or the determined sub-location codes. As one example, if the asset is relatively high above a secure surface (e.g., at least ten meters above a floor, a roof, etc.), service notification platform 260 may generate a tag indicating that fall-related safety measures should be taken if servicing the asset. As another example, if the location associated with the sub-location code is on a fourth story of a building (and/or is at a height that potentially corresponds to the fourth story), service notification platform 260 may generate a tag indicating a building unit number associated with the fourth story of the building. In some embodiments, as noted above, tags may additionally, or alternatively, be received from technicians, operators, etc., such as via an API, web portal, etc.

As further shown in FIG. 13, process 1300 may include generating or modifying an association of the asset with the generated location codes, sub-location codes, enhanced sub-location codes, and/or tags (block 1350). For example, service notification platform 260 (e.g., using computing resource 265, processor 320, memory 330, storage component 340, input component 350, output component 360, communication interface 370 and/or the like) may generate one or more data structures similar to those shown in FIGS. 11 and/or 12, to indicate the association of particular assets with particular precise locations or sub-locations in three-dimensional space. Such associations may be used, for example, as address-occupant pairs (e.g., as discussed above with respect to FIG. 4), infrastructure information (e.g., as also discussed above with respect to FIG. 4), or the like.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

As used herein, satisfying a threshold may, depending on the context, refer to a value being greater than the threshold, more than the threshold, higher than the threshold, greater than or equal to the threshold, less than the threshold, fewer than the threshold, lower than the threshold, less than or equal to the threshold, equal to the threshold, etc., depending on the context.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A device, comprising:
   one or more processors configured to:
      determine first location information associated with a first asset, the first location information indicating a particular two-dimensional location associated with the first asset;
      generate or receive a first code based on the received first location information, the first code being associated with the particular two-dimensional location associated with the first asset;
      determine first height information associated with the first asset;
      generate a second code based on the first code and the first height information;
      store association information associating the first asset with the second code;
      determine second location information associated with a second asset, the second location information indicating the same particular two-dimensional location associated with the first asset;
      determine that the first code, associated with the particular two-dimensional location associated with the first asset, is further associated with the particular two-dimensional location associated with the second asset;
      determine second height information associated with the second asset, the second height information being different from the first height information;
      generate a third code based on the first code and the second height information, the third code being different from the second code;
      store association information associating the second asset with the third code;
      receive a first request for location information associated with the first asset;
      output, in response to the first request, the second code;
      receive a second request for location information associated with the second asset; and
      output, in response to the second request, the third code.

2. The device of claim 1, wherein the one or more processors are further configured to:
   store association information associating the first and second assets with the first code; and
   further output, in response to each of the first and second requests, the first code.

3. The device of claim 1, wherein generating the second code includes performing a hash function based on the first height information and the first code.

4. The device of claim 1, wherein the first height information indicates an altitude of the first asset.

5. The device of claim 1, wherein the one or more processors are further configured to:
   determine a street address associated with the first location information;
   store association information further associating the first asset with the street address; and
   further output, in response to the first request, the street address.

6. The device of claim 1, wherein the two-dimensional location associated with the first asset is represented by one or more sets of latitude and longitude coordinates.

7. The device of claim 1, wherein determining the first location information associated with the first asset includes:
performing at least one of a Global Positioning System ("GPS") technique to determine the first location information, or
performing a wireless triangulation technique to determine the first location information.

8. A non-transitory computer-readable medium, storing a plurality of processor-executable instructions to:
determine first location information associated with a first asset, the first location information indicating a particular two-dimensional location associated with the first asset;
generate or receive a first code based on the received first location information, the first code being associated with the particular two-dimensional location associated with the first asset;
determine first height information associated with the first asset;
generate a second code based on the first code and the first height information;
store association information associating the first asset with the second code;
determine second location information associated with a second asset, the second location information indicating the same particular two-dimensional location associated with the first asset;
determine that the first code, associated with the particular two-dimensional location associated with the first asset, is further associated with the particular two-dimensional location associated with the second asset;
determine second height information associated with the second asset, the second height information being different from the first height information;
generate a third code based on the first code and the second height information, the third code being different from the second code;
store association information associating the second asset with the third code;
receive a first request for location information associated with the first asset;
output, in response to the first request, the second code;
receive a second request for location information associated with the second asset; and
output, in response to the second request, the third code.

9. The non-transitory computer-readable medium of claim 8, wherein the plurality of processor-executable instructions further include processor-executable instructions to:
store association information associating the first and second assets with the first code; and
further output, in response to each of the first and second requests, the first code.

10. The non-transitory computer-readable medium of claim 8, wherein generating the second code includes performing a hash function based on the first height information and the first code.

11. The non-transitory computer-readable medium of claim 8, wherein the first height information indicates an altitude of the first asset.

12. The non-transitory computer-readable medium of claim 8, wherein the plurality of processor-executable instructions further include processor-executable instructions to:
determine a street address associated with the first location information;
store association information further associating the first asset with the street address; and
further output, in response to the first request, the street address.

13. The non-transitory computer-readable medium of claim 8, wherein the two-dimensional location associated with the first asset is represented by one or more sets of latitude and longitude coordinates.

14. The non-transitory computer-readable medium of claim 8, wherein determining the first location information associated with the first asset includes:
performing at least one of a Global Positioning System ("GPS") technique to determine the first location information, or
performing a wireless triangulation technique to determine the first location information.

15. A method, comprising:
determining first location information associated with a first asset, the first location information indicating a particular two-dimensional location associated with the first asset;
generating or receiving a first code based on the received first location information, the first code being associated with the particular two-dimensional location associated with the first asset;
determining first height information associated with the first asset;
generating a second code based on the first code and the first height information;
storing association information associating the first asset with the second code;
determining second location information associated with a second asset, the second location information indicating the same particular two-dimensional location associated with the first asset;
determining that the first code, associated with the particular two-dimensional location associated with the first asset, is further associated with the particular two-dimensional location associated with the second asset;
determining second height information associated with the second asset, the second height information being different from the first height information;
generating a third code based on the first code and the second height information, the third code being different from the second code;
storing association information associating the second asset with the third code;
receiving a first request for location information associated with the first asset;
outputting, in response to the first request, the second code;
receiving a second request for location information associated with the second asset; and
outputting, in response to the second request, the third code.

16. The method of claim 15, the method further comprising:
storing association information associating the first and second assets with the first code; and
further outputting, in response to each of the first and second requests, the first code.

17. The method of claim 15, wherein generating the second code includes performing a hash function based on the first height information and the first code.

18. The method of claim 15, the method further comprising:
- determining a street address associated with the first location information;
- storing association information further associating the first asset with the street address; and
- further outputting, in response to the first request, the street address.

19. The method of claim 15, wherein the two-dimensional location associated with the first asset is represented by one or more sets of latitude and longitude coordinates.

20. The method of claim 15, wherein determining the first location information associated with the first asset includes:
- performing at least one of a Global Positioning System ("GPS") technique to determine the first location information, or
- performing a wireless triangulation technique to determine the first location information.

\* \* \* \* \*